US012352988B2

United States Patent
Sell et al.

(10) Patent No.: US 12,352,988 B2
(45) Date of Patent: Jul. 8, 2025

(54) GRADIENT ENCAPSULATION OF WAVEGUIDE GRATINGS

(71) Applicant: Applied Materials, Inc., Santa Clara, CA (US)

(72) Inventors: David Sell, Santa Clara, CA (US); Brian Alexander Cohen, Delmar, NY (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 1048 days.

(21) Appl. No.: 17/329,955

(22) Filed: May 25, 2021

(65) Prior Publication Data

US 2021/0382212 A1    Dec. 9, 2021

Related U.S. Application Data

(60) Provisional application No. 63/034,316, filed on Jun. 3, 2020.

(51) Int. Cl.
*G02B 5/18* (2006.01)
*G02B 27/01* (2006.01)

(52) U.S. Cl.
CPC ......... *G02B 5/1857* (2013.01); *G02B 5/1819* (2013.01); *G02B 27/0172* (2013.01)

(58) Field of Classification Search
None
See application file for complete search history.

(56) References Cited

U.S. PATENT DOCUMENTS

| | | | |
|---|---|---|---|
| 6,545,808 B1 * | 4/2003 | Ehbets | G02B 6/02085 359/569 |
| 2002/0135876 A1 | 9/2002 | Holm et al. | |
| 2006/0147679 A1 | 7/2006 | Edlinger et al. | |
| 2016/0033784 A1 | 2/2016 | Levola et al. | |
| 2016/0301188 A1 | 10/2016 | Mathai et al. | |
| 2018/0052501 A1 * | 2/2018 | Jones, Jr. | H05K 7/20963 |
| 2019/0056591 A1 | 2/2019 | Tervo et al. | |
| 2019/0121023 A1 | 4/2019 | Tervo | |

(Continued)

FOREIGN PATENT DOCUMENTS

| | | |
|---|---|---|
| CN | 105549150 B | 5/2019 |
| CN | 109997063 A | 7/2019 |

(Continued)

OTHER PUBLICATIONS

Mao et al (A Terahertz polarizer based on multilayer metal grating filled in polyimide film, IEEE Photonics journal, vol. 8, No. 1, pp. 1-7, Feb. 2016). (Year: 2016).*

(Continued)

*Primary Examiner* — Jyotsna V Dabbi
(74) *Attorney, Agent, or Firm* — Patterson + Sheridan, LLP

(57) ABSTRACT

Gradient encapsulation of waveguide outcoupler gratings for control of diffraction efficiency and directionality includes a first grating formed over a substrate, the first grating having a plurality of first structures extending away from the substrate, the first grating corresponding to an outcoupler. The device includes a first encapsulant disposed in one or more gaps formed between adjacent first structures, where a fill ratio of the first encapsulant decreases along the first grating. Also described herein are methods for fabricating the device.

19 Claims, 14 Drawing Sheets

(56) References Cited

U.S. PATENT DOCUMENTS

| | | | |
|---|---|---|---|
| 2019/0258008 A1 | 8/2019 | Hautala et al. | |
| 2019/0324202 A1 | 10/2019 | Colburn et al. | |
| 2020/0033530 A1* | 1/2020 | Colburn | H01J 37/20 |
| 2020/0064553 A1 | 2/2020 | Frish | |
| 2020/0110205 A1 | 4/2020 | Rahomäki et al. | |
| 2020/0110206 A1* | 4/2020 | Rahomaki | B29D 11/00769 |
| 2021/0191122 A1* | 6/2021 | Yaroshchuk | G02B 27/4205 |
| 2021/0199971 A1* | 7/2021 | Lee | G02B 27/0172 |

FOREIGN PATENT DOCUMENTS

| | | |
|---|---|---|
| EP | 0960347 A1 | 12/1999 |
| JP | 2001511906 A | 8/2001 |
| JP | 2010072401 A | 4/2010 |
| KR | 102113434 B1 | 5/2020 |
| KR | 20200056146 A | 5/2020 |
| TW | 1480605 B | 4/2015 |
| TW | 201814337 A | 4/2018 |
| TW | 202017042 A | 5/2020 |
| WO | 2018126760 A1 | 7/2018 |
| WO | 2018220270 A1 | 12/2018 |

OTHER PUBLICATIONS

Taiwan Office Action dated Aug. 14, 2024 for Application No. 112146796.
European Search Report issued to patent application No. 21817821.8 on Jun. 6, 2024.
Japanese Office Action issued to Patent Application No. 2022-574187 on Dec. 19, 2023.
Taiwan Office Action issued to Application No. 110119344 on Jun. 16, 2023.
International Search Report dated Sep. 15, 2021 for Application No. PCT/US2021/034040.
Japanese Office Action dated Sep. 3, 2024 for Application No. 2022-574187.
Korean Office Action dated Dec. 2, 2024 for Application No. 10-2022-7046188.
Japanese Office Action dated Mar. 10, 2025 for Application No. 2022-574187.

* cited by examiner

GRADIENT ENCAPSULATION OF WAVEGUIDE GRATINGS

CROSS-REFERENCE TO RELATED APPLICATIONS

This application claims the benefit of U.S. Provisional Patent Application Ser. No. 63/034,316, filed on Jun. 3, 2020, the entirety of which is herein incorporated by reference.

BACKGROUND

Field

Embodiments of the present disclosure generally relate to augmented reality waveguides. More specifically, embodiments described herein relate to gradient encapsulation of waveguide outcoupler gratings for control of diffraction efficiency and directionality.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhance or augment the environment that the user experiences. As an emerging technology, there are many challenges and design constraints with augmented reality.

One such challenge is displaying a virtual image overlaid on an ambient environment. Augmented waveguide combiners are used to assist in overlaying images. Generated light is in-coupled into an augmented waveguide combiner, propagated through the augmented waveguide combiner, out-coupled from the augmented waveguide combiner, and overlaid on the ambient environment. Light is coupled into and out of augmented waveguide combiners using surface relief gratings. The diffraction efficiency and directionality of the out-coupled light may not be adequately controlled.

Accordingly, what is needed in the art are improved waveguide combiners and methods of fabrication.

SUMMARY

In one embodiment, a device is provided. The device includes a first grating formed over a substrate, the first grating having a plurality of first structures extending away from the substrate, the first grating corresponding to an outcoupler. The device includes a first encapsulant disposed in one or more gaps formed between adjacent first structures, where a fill ratio of the first encapsulant decreases along the first grating.

In another embodiment, a device is provided. The device includes a first grating formed over a substrate, the first grating having a plurality of first structures extending away from the substrate, the first grating corresponding to an outcoupler. The device includes a first encapsulant disposed in one or more first gaps formed between adjacent first structures, where a fill ratio of the first encapsulant decreases along the first grating. The device includes a second grating formed over the substrate, the second grating having a plurality of second structures extending away from the substrate, the second grating corresponding to an incoupler.

In yet another embodiment, a method is provided. The method includes forming a first grating over a substrate, the first grating having a plurality of first structures extending away from the substrate, the first grating corresponding to an outcoupler. The method includes forming a second grating over the substrate, the second grating having a plurality of second structures extending away from the substrate, the second grating corresponding to an incoupler. The method includes depositing a first encapsulant over the first and second gratings, curing the first encapsulant, and forming a patterned photoresist layer over the first and second gratings. The method includes etching the first encapsulant via the patterned photoresist layer, where a fill ratio of the first encapsulant decreases along the first grating and depositing a global encapsulant over the first and second gratings.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to gradient encapsulation of waveguide outcoupler gratings for control of diffraction efficiency and directionality. A device includes a first grating formed over a substrate, the first grating having a plurality of first structures extending away from the substrate, the first grating corresponding to an outcoupler. The device includes a first encapsulant disposed in one or more gaps formed between adjacent first structures, where a fill ratio of the first encapsulant decreases along the first grating. Also described herein are methods for fabricating the device.

Figure 1A:
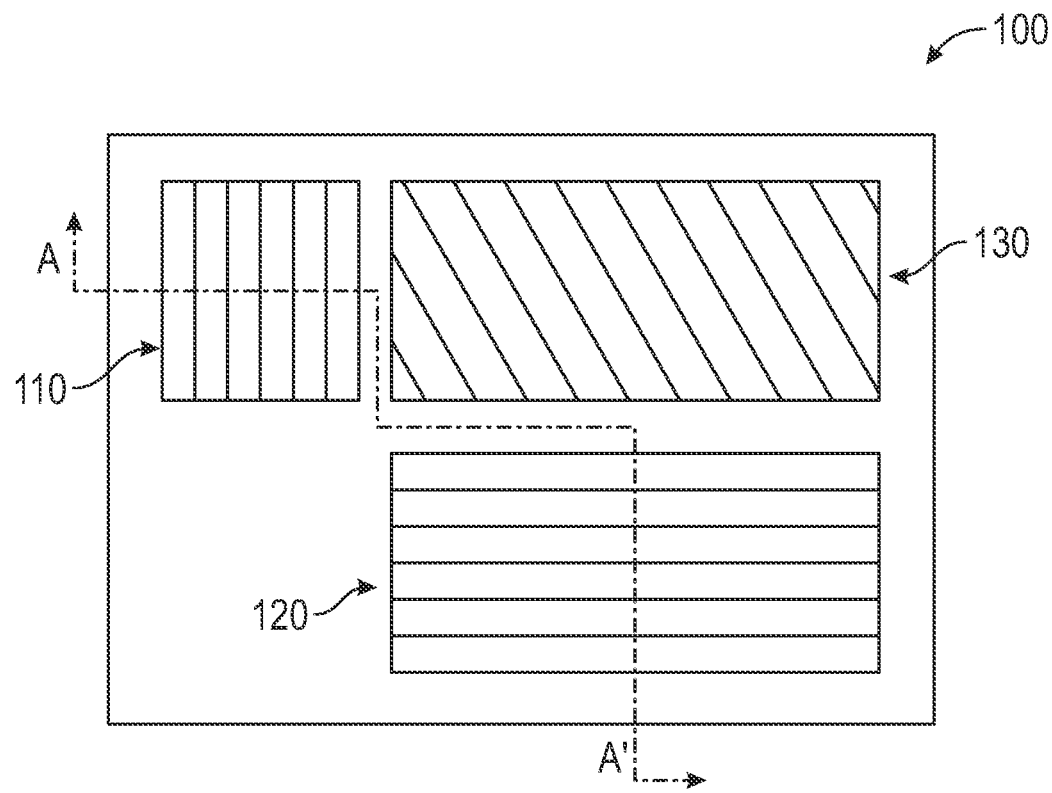
FIG. 1A is a perspective, frontal view of a waveguide combiner according to an embodiment.

FIG. 1A is a perspective, frontal view of an exemplary waveguide combiner 100 (e.g., for augmented reality (AR) applications). It is to be understood that the waveguide combiner 100 described below is an exemplary waveguide combiner that may be formed utilizing the systems and methods described herein, and that the systems and methods of the present disclosure may be utilized to form or modify other optical devices and nanostructured optical devices, such as other waveguide combiners. For example, an optical device having more than three gratings may be formed, such as five or more gratings. Alternatively, an optical device having less than three gratings may be formed, such as two gratings. In another example, an optical device having gratings on both major planar sides may be formed. In yet another example, an optical device having more than one input coupler and more than one output coupler may be formed.

The waveguide combiner 100 includes a first grating 110 corresponding to an incoupler, a second grating 120 corresponding to an outcoupler, and a third grating 130 between the incoupler and outcoupler. In some embodiments, the waveguide combiner 100 may include one or more additional gratings. Here, the third grating 130 is an intermediate grating for expanding the light between the first and second gratings 110, 120. It will be appreciated that the third grating 130 may be optional. In some embodiments, the first, second, and third gratings 110, 120, 130 are arranged so as to achieve substantially total internal reflection of light between the incoupler and outcoupler.

Figure 1B:
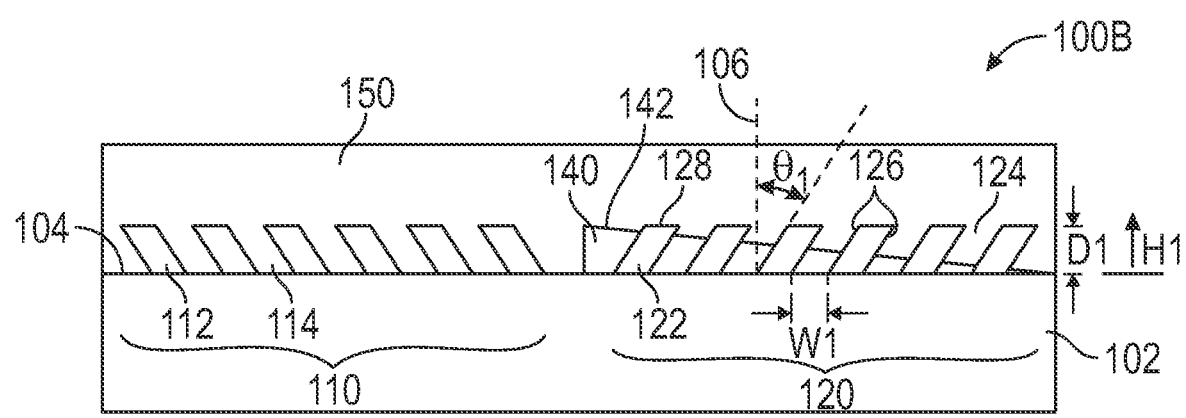
FIG. 1B is a schematic, cross-sectional view taken along line A-A' of FIG. 1A illustrating a waveguide combiner according to an embodiment.

FIG. 1B is a schematic, cross-sectional view taken along line A-A' of FIG. 1A illustrating a waveguide combiner 100B according to an embodiment. The waveguide combiner 100B includes a substrate 102. The substrate 102 may be formed from any suitable material and have any suitable thickness, provided that the substrate 102 can adequately transmit light in a desired wavelength or wavelength range and can serve as an adequate support for the grating(s). In some embodiments, the material of the substrate 102 includes, but is not limited to, one or more of silicon (Si), silicon dioxide (SiO2), silicon carbide (SiC), glass, plastic, polycarbonate, and sapphire-containing materials. In some embodiments, the substrate 102 includes doped glass. For example, the substrate 102 includes glass doped with a heavy dopant such as lanthanum (La), zirconium (Zr), zinc (Zn), and the like. The materials of the substrate 102 may further have rollable and flexible properties. In some embodiments, the material of the substrate 102 includes, but is not limited to, materials having a refractive index between about 1.5 and about 2.4. For example, the substrate 102 may be a doped high index substrate having a refractive index between about 1.7 and about 2.4.

The waveguide combiner 100B includes the first grating 110 and a second grating 120 disposed on the substrate 102. In some embodiments, the first and second gratings 110, 120 may be disposed on one or more spacer layers (not shown) disposed on the substrate 102. In embodiments including a spacer layer, the spacer layer is operable to provide support for the first and second gratings 110, 120 and is of a thickness and material according to the desired optical characteristics of the first and second gratings 110, 120. The first grating 110 includes a plurality of structures 112 extending above the substrate 102 and having gaps 114 formed between adjacent structures 112. Likewise, the second grating 120 includes a plurality of structures 122 extending above the substrate 102 and having gaps 124 formed between sidewalls 126 of adjacent structures 122. In some embodiments, the structures 112, 122 may be fins. In some embodiments, the structures 112, 122 may be disposed in the substrate 102. In other words, the substrate 102 may be etched to form the structures 112, 122 disposed therein.

In some embodiments, the structures 112, 122 may be asymmetric (e.g., slanted or wedged). Here, the structures 112 are slanted opposite the structures 122. In some other embodiments, the structures 112, 122 may be slanted in the same direction. Here, the structures 112 are slanted left whereas the structures 122 are slanted right. However, the orientation of the structures 112, 122 is not particularly limited to the illustrated embodiment. For example, the structures 112, 122 may be slanted opposite relative to the depicted embodiment.

Here, the structures 122 are slanted at an angle θ1 relative to the surface normal 106, the slant angle θ1 of each structure 122 being substantially the same. In another embodiment, the slant angle θ1 of one structure 122 may be different from the slant angle θ1 of other structures 122. In some embodiments, the slant angle θ1 may be from about 30 degrees to about 60 degrees, such as from about 40 degrees to about 60 degrees, alternatively from about 30 degrees to about 40 degrees, alternatively from about 40 degrees to about 50 degrees, alternatively from about 50 degrees to about 60 degrees, such as about 50 degrees. In some embodiments, the slant angle θ1 may be from about 0 degrees to about 30 degrees, such as from about 0 degrees to about 10 degrees, alternatively from about 10 degrees to about 20 degrees, alternatively from about 20 degrees to about 30 degrees. In some embodiments, the structures 122 may have a slant angle θ1 equal to zero relative the surface normal 106, and thus, the structures 122 may be binary structures. Here, each structure 122 has a single portion. In another embodiment, the structures 122 may have two or more portions having different slant angles relative to the surface normal 106. In some embodiments, the material of the structures 122 is selected based on the desired depth and slant angle θ1 of the structures 122.

The gaps 124 have a depth D1 defined as the distance from a surface 104 of the substrate 102 to a top surface 128 of the structures 122 and a width W1 defined as the distance between sidewalls 126 of adjacent structures 122. Here, the depth D1 of each gap 124 is substantially the same. In another embodiment, the depth D1 of at least one gap 124 may be different from the depth D1 of other gaps 124. Here, the width W1 of each gap 124 is substantially the same. In another embodiment, the width W1 of at least one gap 124 may be different from the width W1 of other gaps 124.

In some embodiments, one or more of the structures 112, 122 can include structures having different geometries, such as different slant angles or dimensions from that of other structures in that grating. Additionally, a slant angle of one discreet structure within the plurality of structures 112, 122 may be different across a length or width of the grating thereof.

The first and second gratings 110, 120 independently include at least one of silicon oxycarbide (SiOC), titanium oxide ($TiO_x$), $TiO_x$ nanomaterials, niobium oxide ($NbO_x$), niobium-germanium ($Nb_3Ge$), silicon dioxide ($SiO_2$), silicon oxycarbonitride (SiOCN), vanadium (IV) oxide (VOx), aluminum oxide ($Al_2O_3$), indium tin oxide (ITO), zinc oxide (ZnO), tantalum pentoxide ($Ta_2O_5$), silicon nitride ($Si_3N_4$), $Si_3N_4$ silicon-rich, $Si_3N_4$ hydrogen-doped, $Si_3N_4$ boron-doped, silicon carbon nitrate (SiCN), titanium nitride (TiN), zirconium dioxide ($ZrO_2$), germanium (Ge), gallium phosphide (GaP), poly-crystalline diamond (PCD), nanocrystalline diamond (NCD), and doped diamond containing materials. In some embodiments, the substrate 102 may be formed from any material included in the first and second gratings 110, 120, and vice versa. In some embodiments, the substrate 102 and the first and second gratings 110, 120 may be formed from the same material(s).

The first and second gratings 110, 120 may be formed over the surface of the substrate 102 by any suitable process. For example, the first and second gratings 110, 120 may be formed by one or more of physical vapor deposition (PVD), chemical vapor deposition (CVD), plasma-enhanced CVD (PECVD), flowable CVD (FCVD), atomic layer deposition (ALD), and spin-on processes.

In some embodiments, the material of the first and second gratings 110, 120 may have a refractive index from about 1.5 to about 2.65, such as from about 1.5 to about 1.8, alternatively from about 2.2 to about 2.65, alternatively from about 1.8 to about 2.2, alternatively from about 1.8 to about 2, alternatively from about 2 to about 2.2, alternatively from about 1.9 to about 2.1, such as from about 1.9 to about 2, alternatively from about 2 to about 2.1, such as about 2.

In some embodiments, the waveguide combiner 100B may include a grating material layer (not shown) disposed between the substrate 102 and the structures 112, 122 of the first and second gratings 110, 120. The grating material layer may be formed of any suitable materials and by any suitable process including materials and processes used in forming the first and second gratings 110, 120 described above.

The waveguide combiner 100B includes a first encapsulant 140 disposed in the gaps 124 between the structures 122. In some embodiments, the first encapsulant 140 may have a refractive index contrast of about 0.2 or less, such as from about 0 to about 0.2, such as from about 0 to about 0.05, alternatively from about 0.05 to about 0.1, alternatively from about 0.1 to about 0.15, alternatively from about 0.15 to about 0.2, alternatively about 0.1 or less, where the refractive index contrast is defined as the difference in refractive index between the first encapsulant 140 and the second grating 120.

In some embodiments, the first encapsulant 140 may have a refractive index of from about 1.6 to about 2.4, such as from about 1.7 to about 2.3, such as from about 1.8 to about 2.2, such as from about 1.8 to about 2, such as from about 1.9 to about 2, such as from about 1.95 to about 2, alternatively from about 2 to about 2.2, such as from about 2 to about 2.1, such as from about 2 to about 2.05, such as about 2, alternatively from about 1.8 to about 1.85, alternatively from about 1.85 to about 1.9, alternatively from about 1.9 to about 1.95, alternatively from about 1.95 to about 1.96, alternatively from about 1.96 to about 1.97, alternatively from about 1.97 to about 1.98, alternatively from about 1.98 to about 1.99, alternatively from about 1.99 to about 2, alternatively from about 2 to about 2.01, alternatively from about 2.01 to about 2.02, alternatively from about 2.02 to about 2.03, alternatively from about 2.03 to about 2.04, alternatively from about 2.04 to about 2.05, alternatively from about 2.05 to about 2.1, alternatively from about 2.1 to about 2.2, alternatively from about 1.95 to about 2.05.

In some embodiments, the first encapsulant 140 includes at least one of polyimides, polyimide blends, metal-organic polyimide blends, metal oxides, metal nitrides, $Al_2O_3$, $SiO_2$, TiO, TaO, AlN, SiN, $SiO_xN_x$, TiN, TaN, any of the materials forming the substrate 102, any of the materials forming the first and second gratings 110, 120, and any other suitable materials having refractive indices according to the ranges set forth above. In some embodiments, the first encapsulant 140 includes any material having suitable gap fill properties and a refractive index from about 1.8 to about 2.2.

The first encapsulant 140 has a height H1 defined as the distance from the surface 104 of the substrate 102 to a top surface 142 of the encapsulant 140. The first encapsulant 140 has a fill ratio defined as the ratio of the height H1 of the encapsulant 140 to the depth D1 of the second grating 120. Here, the fill ratio decreases linearly from about 1 to about 0 along the second grating 120 from left to right. However, the profile of the first encapsulant 140 is not particularly limited to the illustrated embodiment. For example, in other embodiments, the fill ratio may decrease non-linearly (e.g., according to a power law function, exponential function, or another polynomial function). In some embodiments, the fill ratio may generally decrease while including one or more sections where the fill ratio is constant or even increasing. In some embodiments, the fill ratio may decrease stepwise (i.e., where each gap 124 has a constant fill ratio which is less than the preceding gap 124 and greater than the following gap 124). In some embodiments, the fill ratio may be a combination of any of the above gradients.

In some embodiments, the fill ratio may have a maximum below 1 (i.e., where the encapsulant 140 is below the top surface 128), such as from about 0.5 to about 1, such as from about 0.6 to about 1, such as from about 0.7 to about 1, such as from about 0.8 to about 1, such as from about 0.9 to about 1, alternatively from about 0.8 to about 0.9, alternatively from about 0.7 to about 0.8, alternatively from about 0.6 to about 0.7, alternatively from about 0.5 to about 0.6.

In some embodiments, the fill ratio may have a minimum above 0 (i.e., where the encapsulant 140 is present along the entire surface 104 of the second grating 120), such as from about 0 to about 0.5, such as from about 0 to about 0.4, such as from about 0 to about 0.3, such as from about 0 to about 0.2, such as from about 0 to about 0.1, alternatively from about 0.1 to about 0.2, alternatively from about 0.2 to about 0.3, alternatively from about 0.3 to about 0.4, alternatively from about 0.4 to about 0.5.

In some embodiments, the fill ratio may range from about 0 to about 1, such as from about 0.1 to about 1, such as from about 0.2 to about 1, such as from about 0.3 to about 1, such as from about 0.4 to about 1, such as from about 0.5 to about 1, such as from about 0.6 to about 1, such as from about 0.7 to about 1, such as from about 0.8 to about 1, such as from about 0.9 to about 1, alternatively from about 0 to about 0.9, such as from about 0 to about 0.8, such as from about 0 to about 0.7, such as from about 0 to about 0.6, such as from about 0 to about 0.5, such as from about 0 to about 0.4, such as from about 0 to about 0.3, such as from about 0 to about 0.2, such as from about 0 to about 0.1.

Encapsulant gradients described herein enable control over diffraction efficiency along the second grating 120. The low refractive index contrast of the encapsulant 140 (e.g., about 0.2 or less) decreases the diffraction efficiency compared to unencapsulated gratings (i.e., gratings without the encapsulant 140). Unencapsulated gratings may have air (i.e., refractive index of 1) contacting the surface 104 or may include a global encapsulant having low refractive index (e.g., refractive index contrast greater than about 0.2). In some embodiments, the diffraction efficiency of the second grating 120 may be about 2.5% or less, alternatively from about 1% to about 50% such as from about 1% to about 40%, such as from about 1% to about 30%, such as from about 1% to about 20%, such as from about 1% to about 10%, such as from about 1% to about 5%, such as from about 1 to about 2.5%, alternatively from about 2.5% to about 5%, alternatively from about 5% to about 10%, alternatively from about 10% to about 20%, alternatively from about 20% to about 30%, alternatively from about 30% to about 40%, alternatively from about 40% to about 50%.

In addition to decreasing the diffraction efficiency, encapsulant gradients described herein control the diffraction efficiency along the second grating 120. In some embodiments, as fill ratio increases, diffraction efficiency decreases. For example, as illustrated herein, the left end of the second grating 120 having the greatest fill ratio (i.e., 1) has the lowest diffraction efficiency (i.e. from about 1% to about 5%) and the right end of the second grating 120 having the lowest fill ratio (i.e., 0) has the greatest diffraction efficiency (i.e., from about 40% to about 50%). However, the orientation of the second grating 120 is not particularly limited to the illustrated embodiment. For example, the orientation may be such that the fill ratio of the second grating 120 decreases from right to left.

Conventional devices use shallow depth gratings to lower diffraction efficiency; however, shallow depth gratings limit directionality. Encapsulant gradients described herein can outcouple light at low efficiencies without reducing grating depth. Therefore, encapsulant gradients described herein can enable full-range tuning of diffraction efficiency while maintaining directionality towards the user over the entire surface of the second grating 120. In one or more embodiments, the foregoing advantages compared to conventional devices may result from combining asymmetric structures 122 and encapsulant gradients.

The waveguide combiner 100B includes a global encapsulant 150 over the first and second gratings 110, 120 and the first encapsulant 140. In some embodiments, the global encapsulant 150 may have a refractive index that is lower than that of the first and second gratings 110, 120 and the first encapsulant 140. In some embodiments, the refractive index of the global encapsulant 150 may be from about 1 to about 1.7, such as from about 1.2 to about 1.5. In some embodiments, the global encapsulant 150 may have an absorption coefficient less than about 0.001.

The global encapsulant 150 may be formed of any suitable transparent materials, including but not limited to silica-containing materials and non-silica-containing materials, such as polymer-containing materials, for example, fluoropolymer materials. In some embodiments, the global encapsulant 150 may be formed of silicon dioxide ($SiO_2$) or low-k dielectric films such as carbon- and nitride-doped silicon oxide (SiCON) or silicon carbon nitride (SiCN). In some embodiments, the global encapsulant 150 may include fluorine-containing materials, such as aluminum fluoride ($AlF_3$) and magnesium fluoride ($MgF_2$).

Figure 1C:
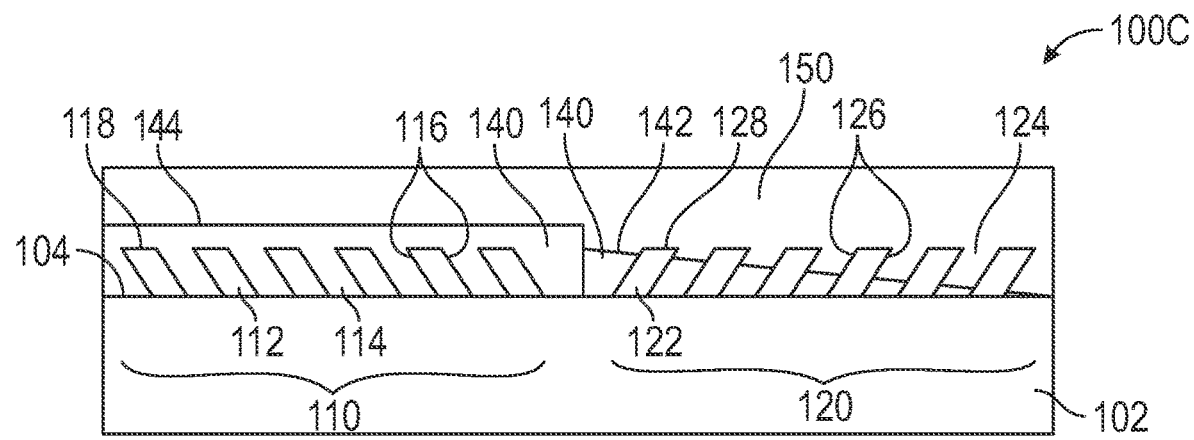
FIG. 1C is a schematic, cross-sectional view taken along line A-A' of FIG. 1A illustrating a waveguide combiner according to another embodiment.

FIG. 1C is a schematic, cross-sectional view taken along line A-A' of FIG. 1A illustrating a waveguide combiner 100C according to another embodiment. The waveguide combiner 100C is similar to the waveguide combiner 100B in most aspects, and the above description of the waveguide combiner 100B may be incorporated herein without limitation.

In contrast to the waveguide combiner 100B, the waveguide combiner 100C includes the first encapsulant 140 over the first grating 110 in addition to the second grating 120. The first encapsulant 140 is disposed in the gaps 114 between sidewalls 116 of adjacent structures 112. Here, the first encapsulant 140 over the first grating 110 has a planar top surface 144, which is higher than the top surface 142 of the first encapsulant 140 over the second grating 120. In some embodiments, the top surface 144 may be non-planar. In some embodiments, the top surface 144 may be at or below the top surface 142. Here, the top surface 144 is higher than a top surface 118 of the structures 112 such that the fill ratio of the gaps 114 is constant, being equal to 1. However, the profile of the first encapsulant 140 over the first grating 110 is not particularly limited to the illustrated embodiment. For example, the fill ratio may be less than 1. In such embodiments, the fill ratio may vary along the first grating 110.

The waveguide combiner 100C includes the global encapsulant 150. Here, the global encapsulant 150 contacts the top surface 144 of the first encapsulant 140 over the first grating 110.

Figure 1D:
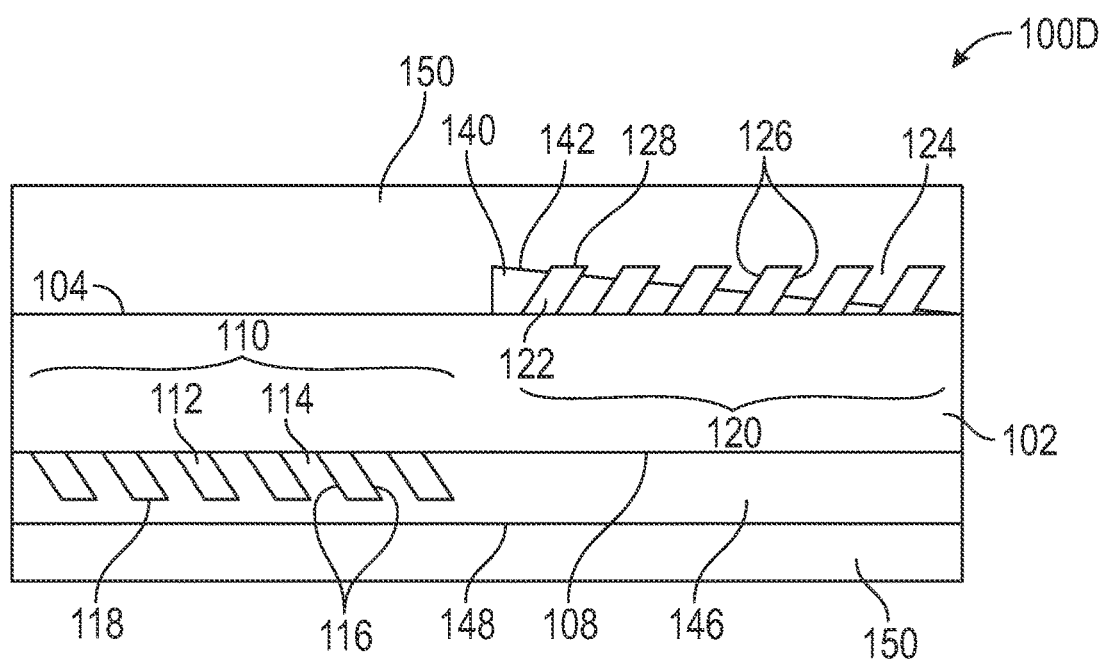
FIG. 1D is a schematic, cross-sectional view taken along line A-A' of FIG. 1A illustrating a waveguide combiner according to yet another embodiment.

FIG. 1D is a schematic, cross-sectional view taken along line A-A' of FIG. 1A illustrating a waveguide combiner 100D according to yet another embodiment. The waveguide combiner 100D is similar to the waveguide combiners 100B and/or 100C in most aspects, and the above description of the waveguide combiners 100B, 100C may be incorporated herein without limitation.

In contrast to the waveguide combiners 100B, 100C, the waveguide combiner 100D has dual-sided gratings, where dual-sided gratings are defined as being on opposite planar sides of the substrate 102. Here, the first grating 110 is disposed on a backside surface 108 of the substrate 102 opposite of the frontside surface 104 on which the second grating 120 is disposed. The waveguide combiner 100D includes a second encapsulant 146 over the first and second gratings 110, 120 on the backside surface 108. The second encapsulant 146 is disposed in the gaps 114 between sidewalls 116 of adjacent structures 112 of the first grating 110. The second encapsulant 146 has a surface 148 facing away from the backside 108 of the substrate 102. The second encapsulant 146 may be the same or different from the first encapsulant 140, and the above description of the first encapsulant 140 may be incorporated herein without limitation.

Here, the second encapsulant 146 covers the backside 108 over the first and second gratings 110, 120. However, the second encapsulant 146 is not particularly limited to the illustrated embodiment. For example, the second encapsulant 146 may only cover the backside 108 over the first grating 110. In some other embodiments, the second encapsulant 146 may be omitted.

The waveguide combiner 100D includes the global encapsulant 150. Here, the global encapsulant 150 contacts the surface 148 of the second encapsulant 146 over the first and second gratings 110, 120.

Figure 2:
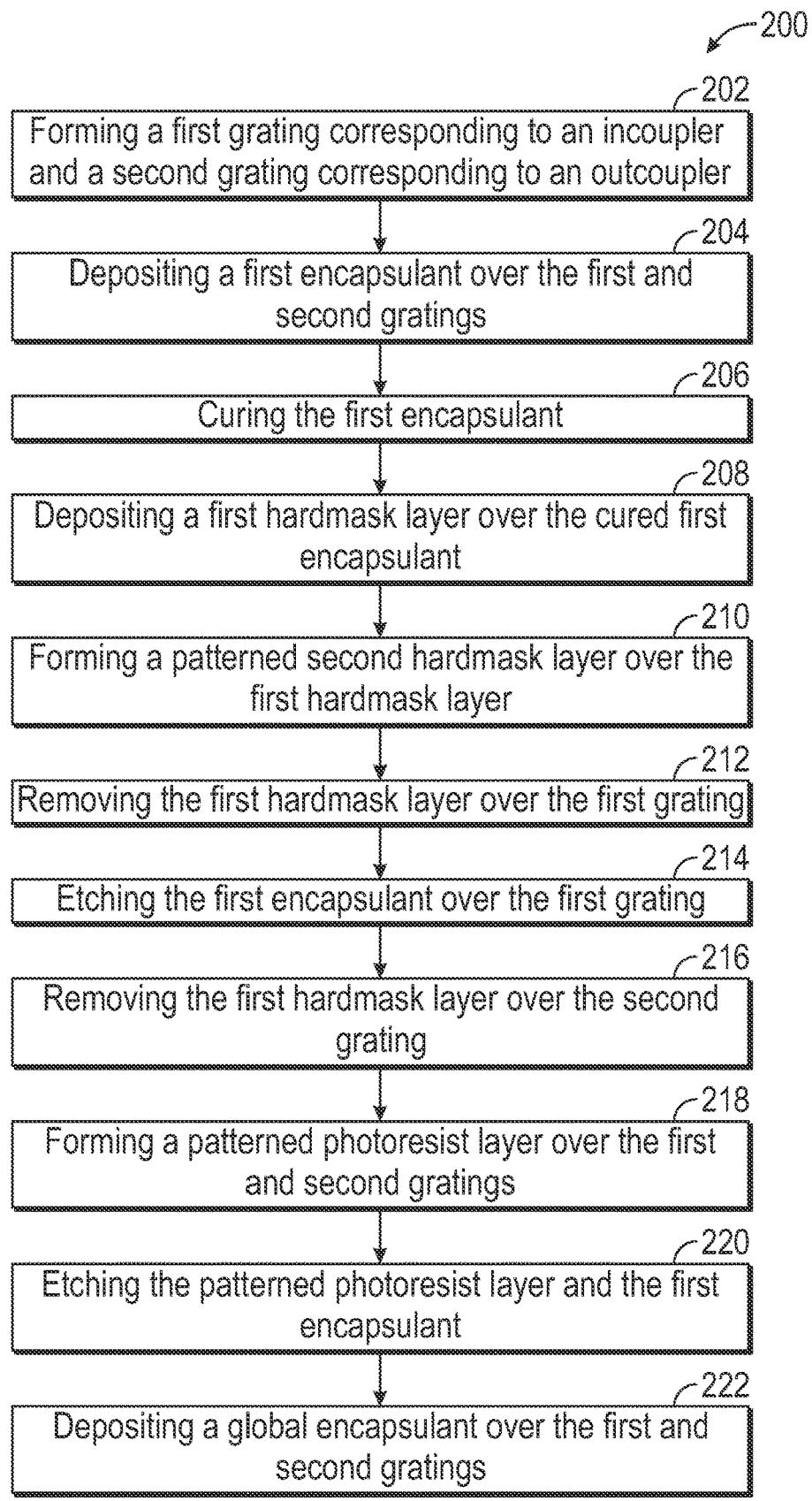
FIG. 2 is a flow chart illustrating operations of a method for encapsulating waveguide gratings according to an embodiment.

FIG. 2 is a flow chart illustrating operations of a method 200 for encapsulating waveguide gratings according to an embodiment. FIGS. 3A-3J are schematic, cross-sectional views of a waveguide combiner 100B during fabrication according to an embodiment.

Figure 3A:
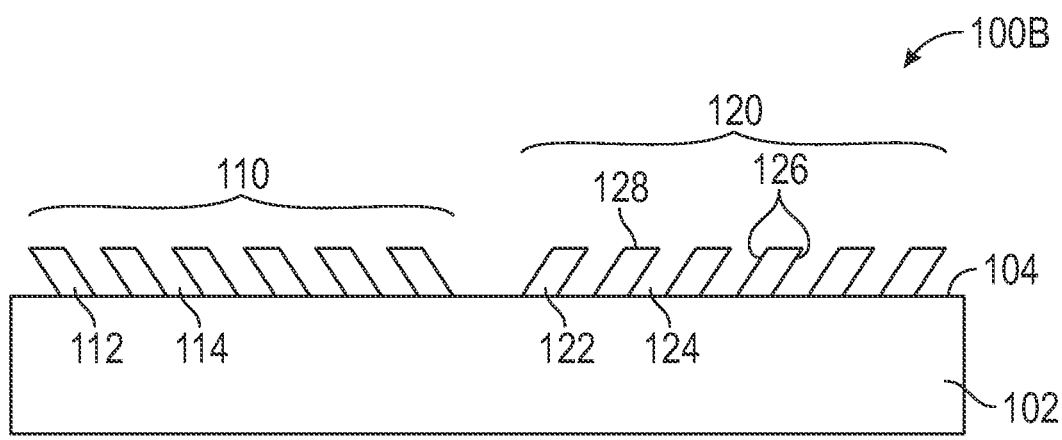
FIGS. 3A-3J are schematic, cross-sectional views of a waveguide combiner during fabrication according to an embodiment.

Referring to FIGS. 2 and 3A, at step 202, the method 200 includes forming the first grating 110 corresponding to an incoupler and the second grating 120 corresponding to an outcoupler. The first and second gratings 110, 120 may be formed using any of the materials and processes described above.

Figure 3B:
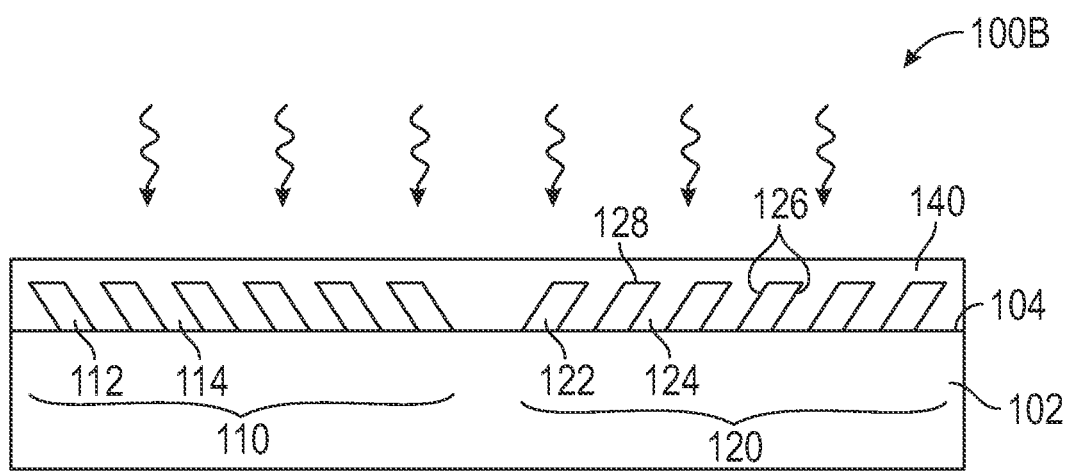

Referring to FIGS. 2 and 3B, at step 204, the method 200 includes depositing the first encapsulant 140 over the first and second gratings 110, 120. The first encapsulant 140 is deposited over the surface 104 of the substrate 102, in the gaps 114, 124, over the structures 112, and along the sidewalls 126 and top surfaces 128 of the structures 122. The first encapsulant 140 may be formed by any suitable process. For example, the first encapsulant 140 may be formed by one or more of PVD, CVD, PECVD, FCVD, ALD, and spin-on processes.

Referring to FIGS. 2 and 3B, at step 206, the method 200 includes curing the first encapsulant 140. In some embodiments, the first encapsulant 140 may be cured by heat, pressure, chemical treatment, or any other suitable curing technique.

Figure 3C:
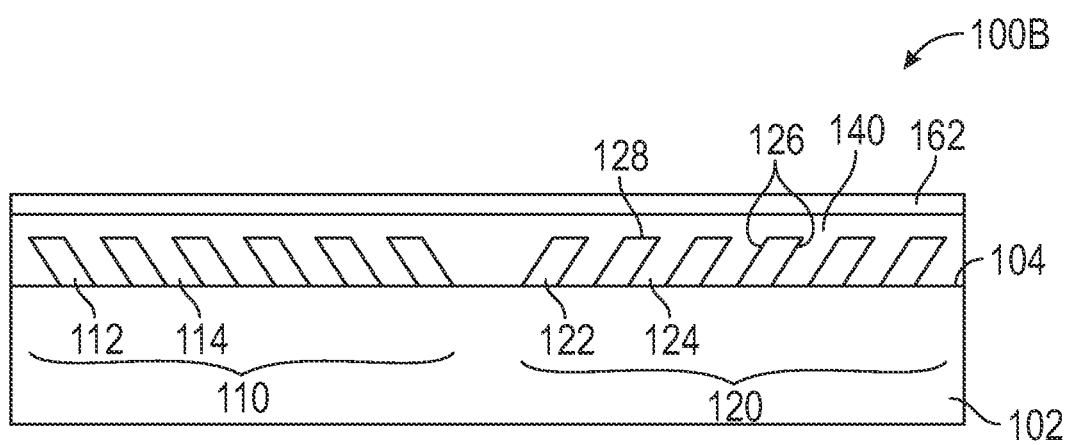

Referring to FIGS. 2 and 3C, at step 208, the method 200 includes depositing a first hardmask layer 162 over the cured first encapsulant 140. The first hardmask layer 162 includes at least one of titanium nitride, silicon nitride, and silicon carbide. The first hardmask layer 162 may be formed by any suitable process. For example, the first hardmask layer 162 may be formed by one or more of PVD, CVD, PECVD, FCVD, ALD, and spin-on processes.

Figure 3D:
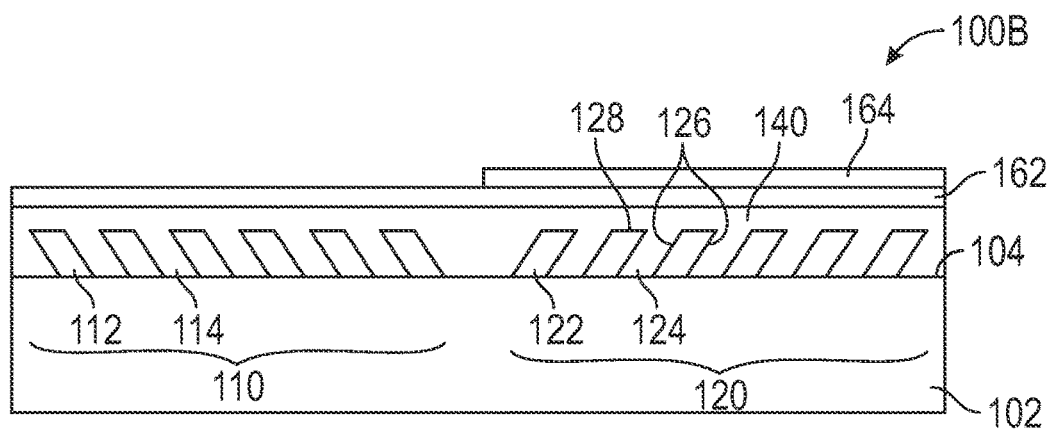

Referring to FIGS. 2 and 3D, at step 210, the method 200 includes forming a patterned second hardmask layer 164 over the first hardmask layer 162. The patterned second hardmask layer 164 is disposed over the second grating 120 but not over the first grating 110. Thus, the patterned second hardmask layer 164 can be used as an etch mask for etching the first hardmask layer 162 over the first grating 110. The patterned second hardmask layer 164 includes at least one of a positive or negative tone photoresist, a metal-containing hardmask, a carbon-containing hardmask, an organic planarization layer (OPL), and other suitable hardmask materials. The patterned second hardmask layer 164 may be formed by any suitable process. For example, the patterned second hardmask layer 164 may be formed by one or more of PVD, CVD, PECVD, FCVD, ALD, and spin-on processes.

Figure 3E:
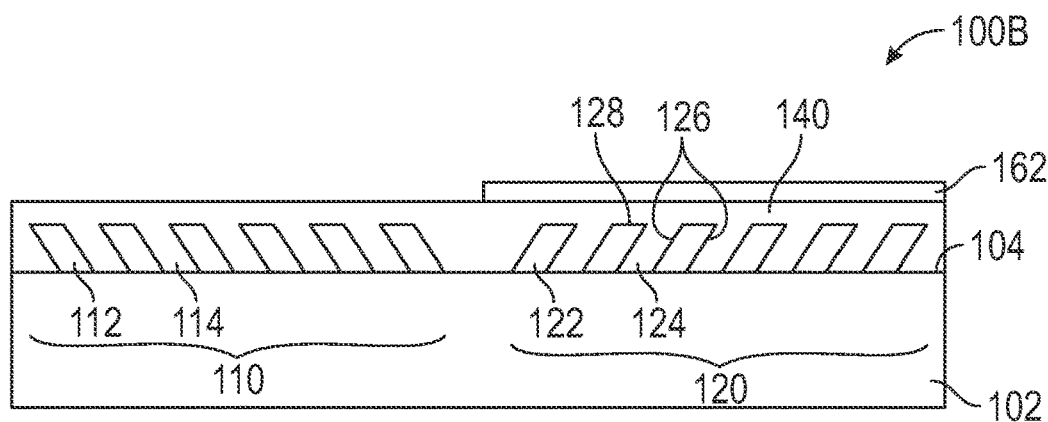

Referring to FIGS. 2 and 3E, at step 212, the method 200 includes removing the first hardmask layer 162 over the first grating 110. The first hardmask layer 162 may be removed by an etching process having etch selectivity for the first hardmask layer 162 relative to the patterned second hardmask layer 164. Thus, the first hardmask layer 162 may be removed from over the first grating 110 without affecting the patterned second hardmask layer 164 and/or the first hardmask layer 162 over the second grating 120. The etching process can include at least one of wet etching, dry etching, reactive ion etching, and plasma etching.

Figure 3F:
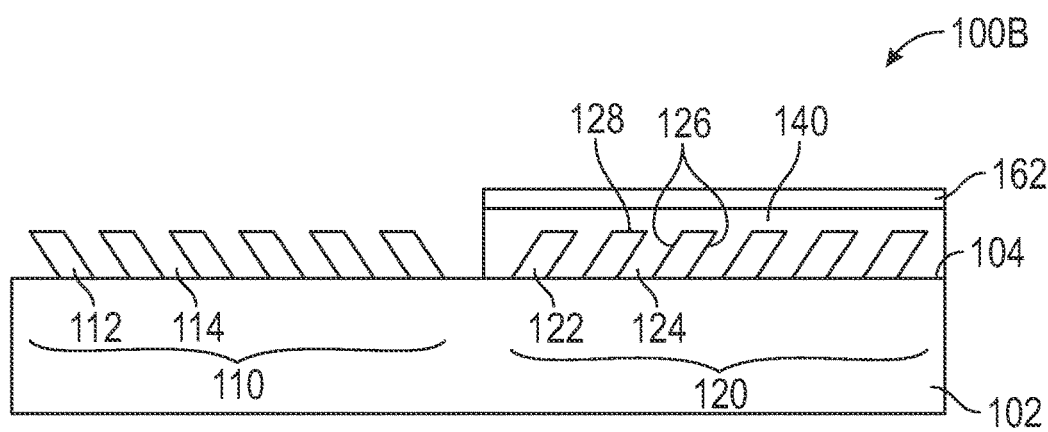

Referring to FIGS. 2 and 3F, at step 214, the method 200 includes etching the first encapsulant 140 over the first grating 110. The first hardmask layer 162 over the second grating 120 may be used as an etch mask for etching the first encapsulant 140 over the first grating 110. The first encapsulant 140 may be removed by an etching process having etch selectivity for the first encapsulant 140 relative to one of the patterned second hardmask layer 164 or the first hardmask layer 162. Thus, the first encapsulant 140 may be removed from over the first grating 110 without affecting the first encapsulant 140 over the second grating 120. The etching process can include at least one of wet etching, dry etching, reactive ion etching, and plasma etching.

Figure 3G:
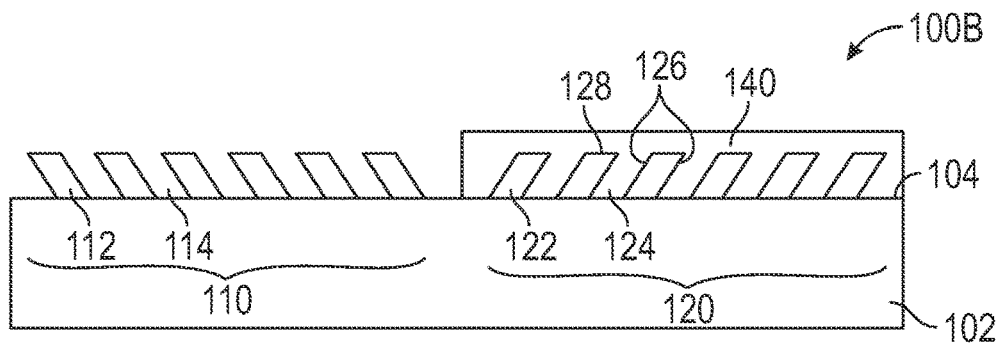

Referring to FIGS. 2 and 3G, at step 216, the method 200 includes removing the first hardmask layer 162 over the second grating 120. The first hardmask layer 162 may be removed from over the second grating 120 to prepare the encapsulant 140 over the second grating 120 for a subsequent etching step. The first hardmask layer 162 may be removed by at least one of stripping, wet etching, dry etching, reactive ion etching, and plasma etching.

Figure 3H:
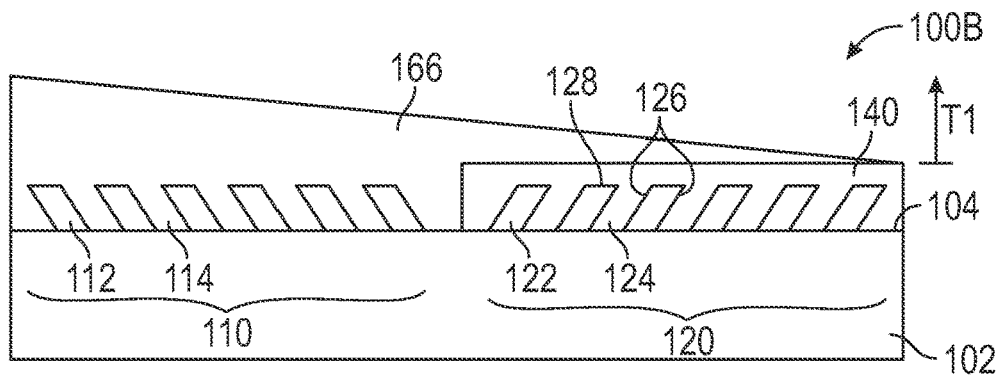

Referring to FIGS. 2 and 3H, at step 218, the method 200 includes forming a patterned photoresist layer 166 over the first and second gratings 110, 120. In some embodiments, the patterned photoresist layer 166 may be formed by any suitable lithography process (e.g., a gray-scale lithography process using scanning gray tone exposure where dosage is increased during scanning across the waveguide combiner 1006 from the first grating 110 to the second grating 120). A gray-scale lithography process may include blanket depositing a photoresist material over the first and second gratings 110, 120. Here, the photoresist material contacts the first grating 110 and the first encapsulant 140 over the second grating 120. In some embodiments, the photoresist material may include but is not limited to, light-sensitive polymer containing materials.

Subsequently, exposure of the photoresist material may include using a gradient of exposure dosage along the photoresist material to form a latent pattern therein. In some embodiments, the latent pattern may include, but is not limited to, any one-, two-, or three-dimensional shape created in the photoresist material using lithography or laser ablation. In some embodiments, the latent pattern may be graded. The shape of the latent pattern may determine a profile of the first encapsulant 140. After forming the latent pattern, the photoresist material may be developed to form the patterned photoresist layer 166 shown in FIG. 3H. The photoresist material may be a positive tone photoresist such that the exposed regions of the photoresist material are removed during development. In some embodiments, developing the photoresist material may include performing a lithography process, such as photolithography, digital lithography, or by performing laser ablation.

Here, the patterned photoresist layer 166 has a thickness T1 measured above the first encapsulant 140 that decreases linearly along the first and second gratings 110, 120. However, the profile of the patterned photoresist layer 166 is not particularly limited to the illustrated embodiment. For example, the profile may decrease non-linearly (e.g., according to a power law function, exponential function, or another polynomial function), the profile may generally decrease while including one or more sections where the profile is constant or even increasing, the profile may decrease stepwise, or the profile may be a combination of any of the above profiles. The profile of the patterned photoresist layer 166 may be transferred to the first encapsulant 140 during subsequent etching.

Figure 3I:
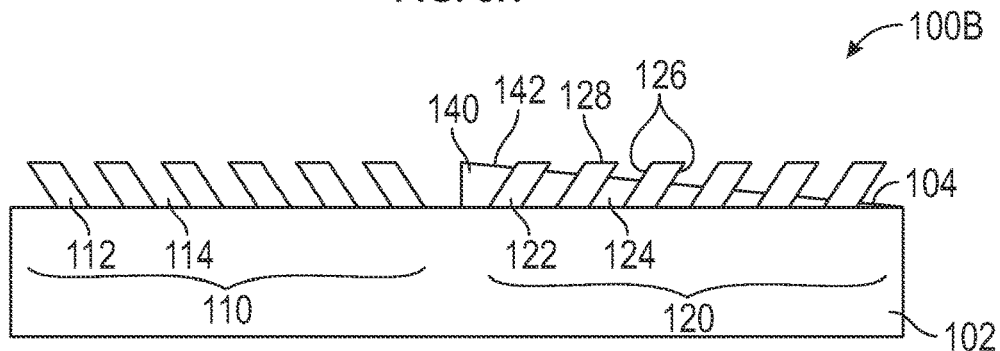

Referring to FIGS. 2 and 3I, at step 220, the method 200 includes etching the patterned photoresist layer 166 and the first encapsulant 140. Here, the etching process exposes portions of the sidewalls 126 and the top surfaces 128 of the structures 122. The etching process can include any suitable directional or non-directional etching process. In some embodiments, the profile of the patterned photoresist layer 166 may be transferred to the first encapsulant 140 by an isotropic etching process. The isotropic etching process may have etch selectivity for the patterned photoresist layer 166 and the first encapsulant 140 relative to the structures 122 such that the first encapsulant 140 may be etched without affecting the underlying structures 122. Here, the patterned photoresist layer 166 and the first encapsulant 140 are removed at substantially the same rate such that the profile of the etched first encapsulant 140 substantially matches the profile of the patterned photoresist layer 166. In some other embodiments, the profile of the etched first encapsulant 140 may differ from the profile of the patterned photoresist layer 166 depending on differences in etch rate or etch selectivity.

In some embodiments, directional etching may be used with or without a gradient formed in the patterned photoresist layer 166. In some embodiments, the top surface 142 of the etched first encapsulant 140 may be perpendicular to the sidewalls 126 of the structures 122. In some embodiments, the etching process may form a stepwise decrease in the etched first encapsulant 140 such that the top surface 142 between adjacent structures 122 is substantially parallel to the surface 104 of the substrate 102.

In some embodiments, the etching process can include a cyclic etching process using one or more proximity masks. In some embodiments, the etching may be uniform. In some other embodiments, the etching may be selective. In some embodiments, a single etch chemistry may be used. In some other embodiments, two or more different etch chemistries may be used.

Figure 3J:
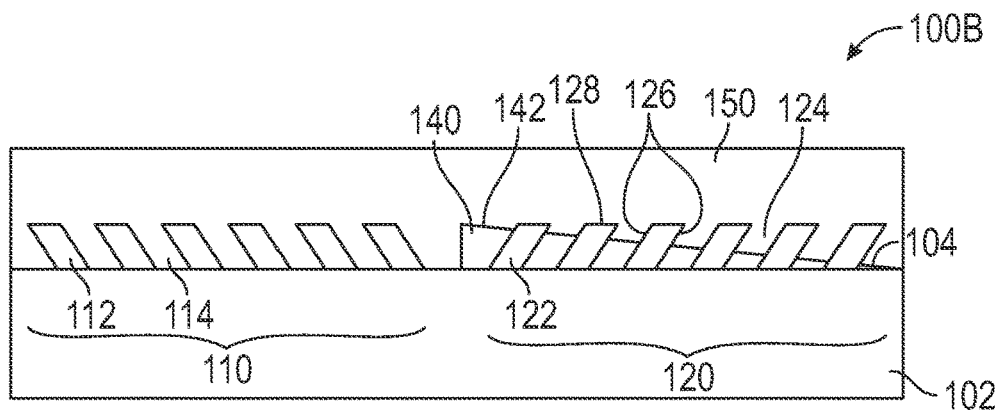

Referring to FIGS. 2 and 3J, at step 222, the method 200 includes depositing the global encapsulant 150 over the first and second gratings 110, 120. The global encapsulant 150 is deposited over the surface 104 of the substrate 102, in the gaps 114, over the structures 112, over the etched first encapsulant 140, and along the exposed sidewalls 126 and top surfaces 128 of the structures 122. The global encapsulant 150 may be formed by any suitable process. For example, the global encapsulant 150 may be formed by one or more of PVD, CVD, PECVD, FCVD, ALD, and spin-on processes.

Figure 4:
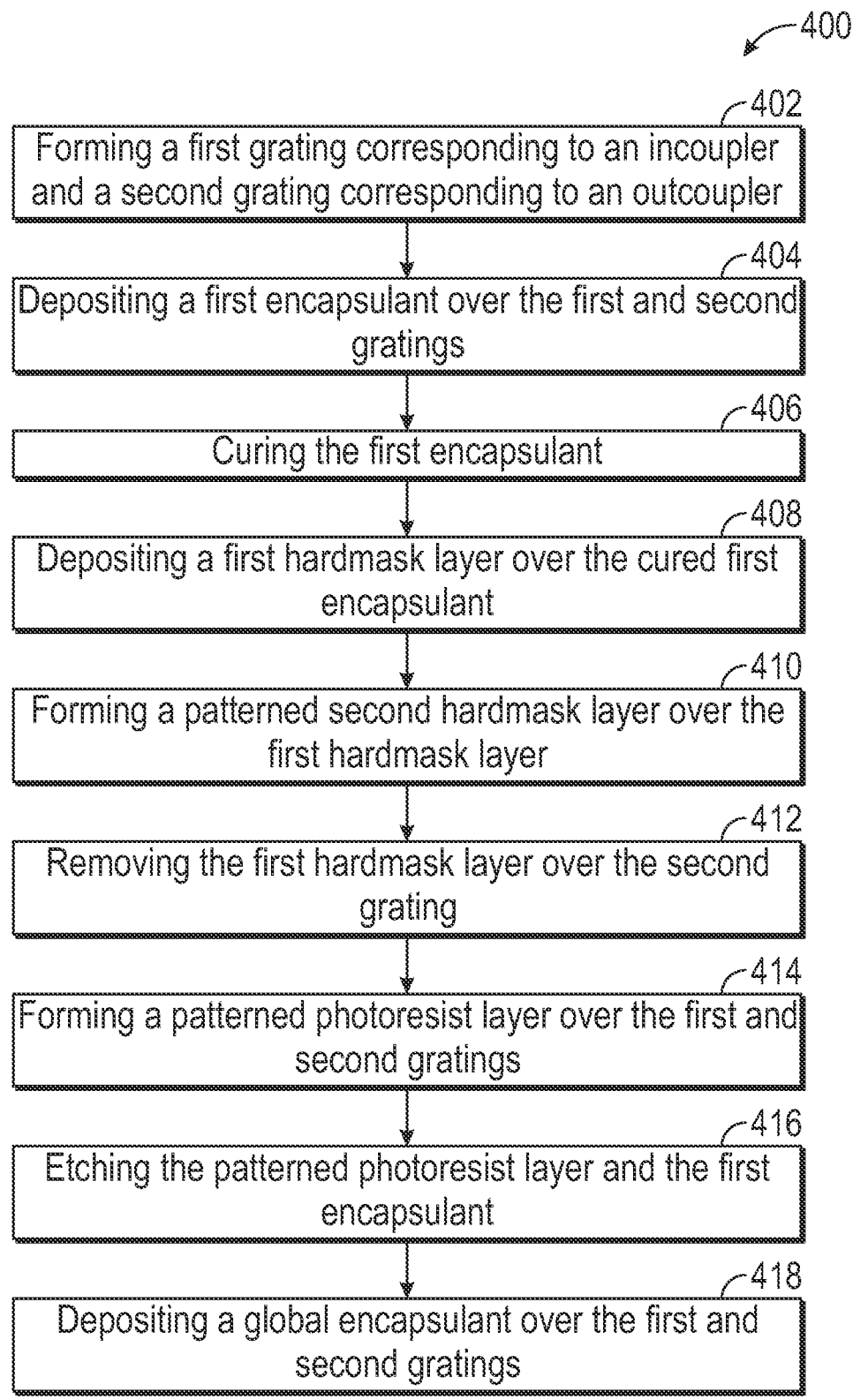
FIG. 4 is a flow chart illustrating operations of a method encapsulating waveguide gratings according to another embodiment.

FIG. 4 is a flow chart illustrating operations of a method 400 for encapsulating waveguide gratings according to an embodiment. FIGS. 5A-5H are schematic, cross-sectional views of a waveguide combiner 100C during fabrication according to an embodiment.

Figure 5A:
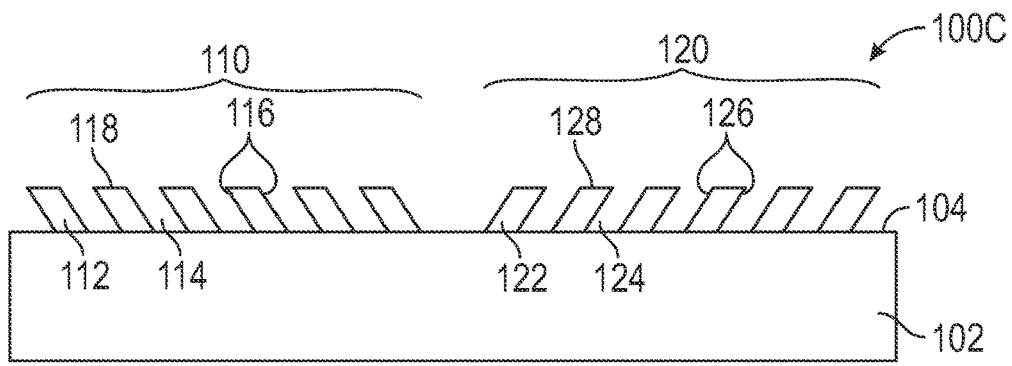
FIGS. 5A-5H are schematic, cross-sectional views of a waveguide combiner during fabrication according to another embodiment.
Figure 5B:
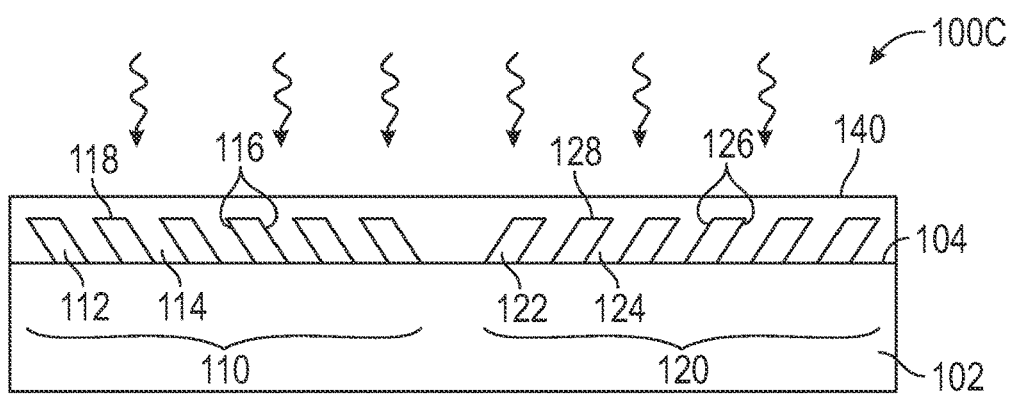
Figure 5C:
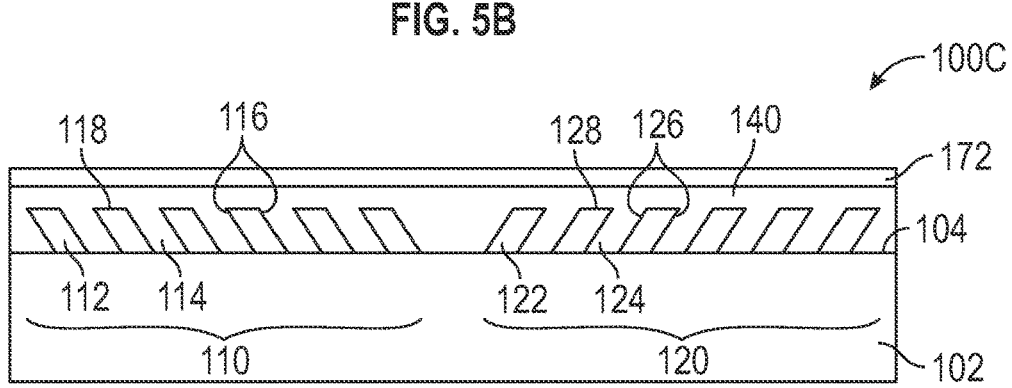

Referring to FIGS. 4 and 5A, at step 402, the method 400 includes forming the first grating 110 corresponding to an incoupler and forming the second grating 120 corresponding to an outcoupler. Referring to FIGS. 4 and 5B, at step 404, the method 400 includes depositing the first encapsulant 140 over the first and second gratings 110, 120. Referring to FIGS. 4 and 5B, at step 406, the method 400 includes curing the first encapsulant 140. Referring to FIGS. 4 and 5C, at step 408, the method 400 includes depositing a first hardmask layer 172 over the cured first encapsulant 140. Steps 402 through 408 are analogous to steps 202 through 208 of the method 200.

Figure 5D:
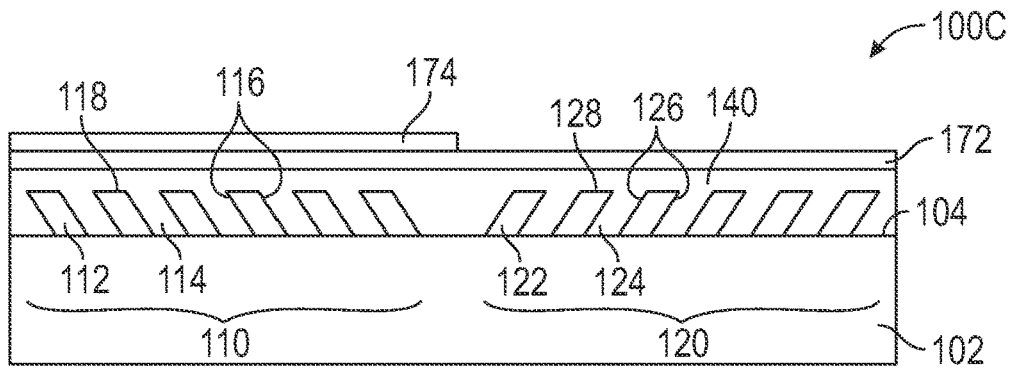

Referring to FIGS. 4 and 5D, at step 410, the method 400 includes forming a patterned second hardmask layer 174 over the first hardmask layer 172. Step 410 is analogous to step 210 of the method 200 except that the patterned second hardmask layer 174 is disposed over the first grating 110 but not over the second grating 120. Thus, the patterned second hardmask layer 174 can be used as an etch mask for etching the first hardmask layer 172 over the second grating 120.

Figure 5E:
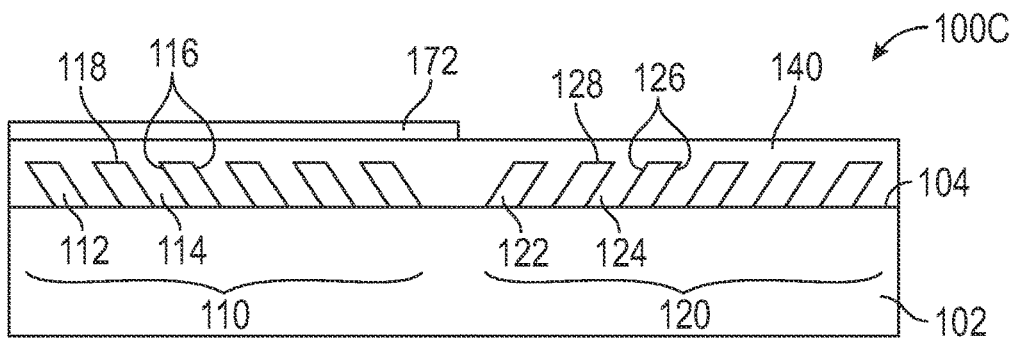

Referring to FIGS. 4 and 5E, at step 412, the method 400 includes removing the first hardmask layer 172 over the second grating 120. Step 412 is analogous to step 216 of the method 200 except that the first hardmask layer 172 remains disposed over the first grating 110.

Figure 5F:
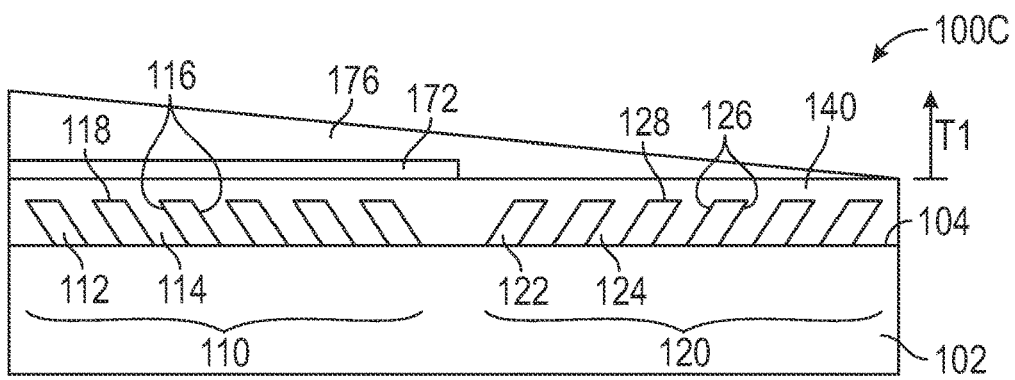

Referring to FIGS. 4 and 5F, at step 414, the method 400 includes forming a patterned photoresist layer 176 over the first and second gratings 110, 120. Step 414 is analogous to step 218 of the method 200 except that the photoresist material contacts the first hardmask layer 172 over the first grating 110 and the first encapsulant 140 over the second grating 120. After forming the latent pattern, the photoresist material may be developed to form the patterned photoresist layer 176 shown in FIG. 5F.

Figure 5G:
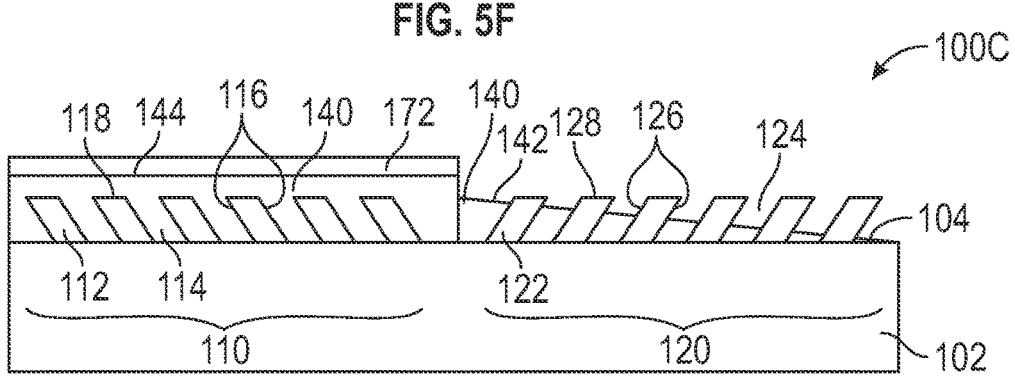

Referring to FIGS. 4 and 5G, at step 416, the method 400 includes etching the patterned photoresist layer 176 and the first encapsulant 140. Step 416 is analogous to step 220 of the method 200 except that the first hardmask layer 172 remaining over the first grating 110 is used as an etch mask for etching the first encapsulant 140 over the second grating 120 without affecting the first encapsulant 140 over the first grating 110.

Figure 5H:
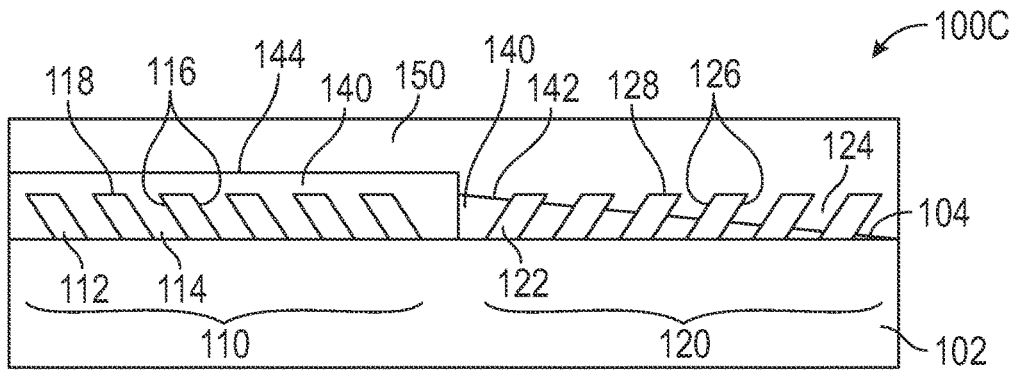

Referring to FIGS. 4 and 5H, at step 418, the method 400 includes depositing the global encapsulant 150 over the first and second gratings 110, 120. Step 418 is analogous to step 222 of the method 200 except that the global encapsulant 150 is disposed on the top surface 144 of the first encapsulant 140 over the first grating 110.

Figure 6:
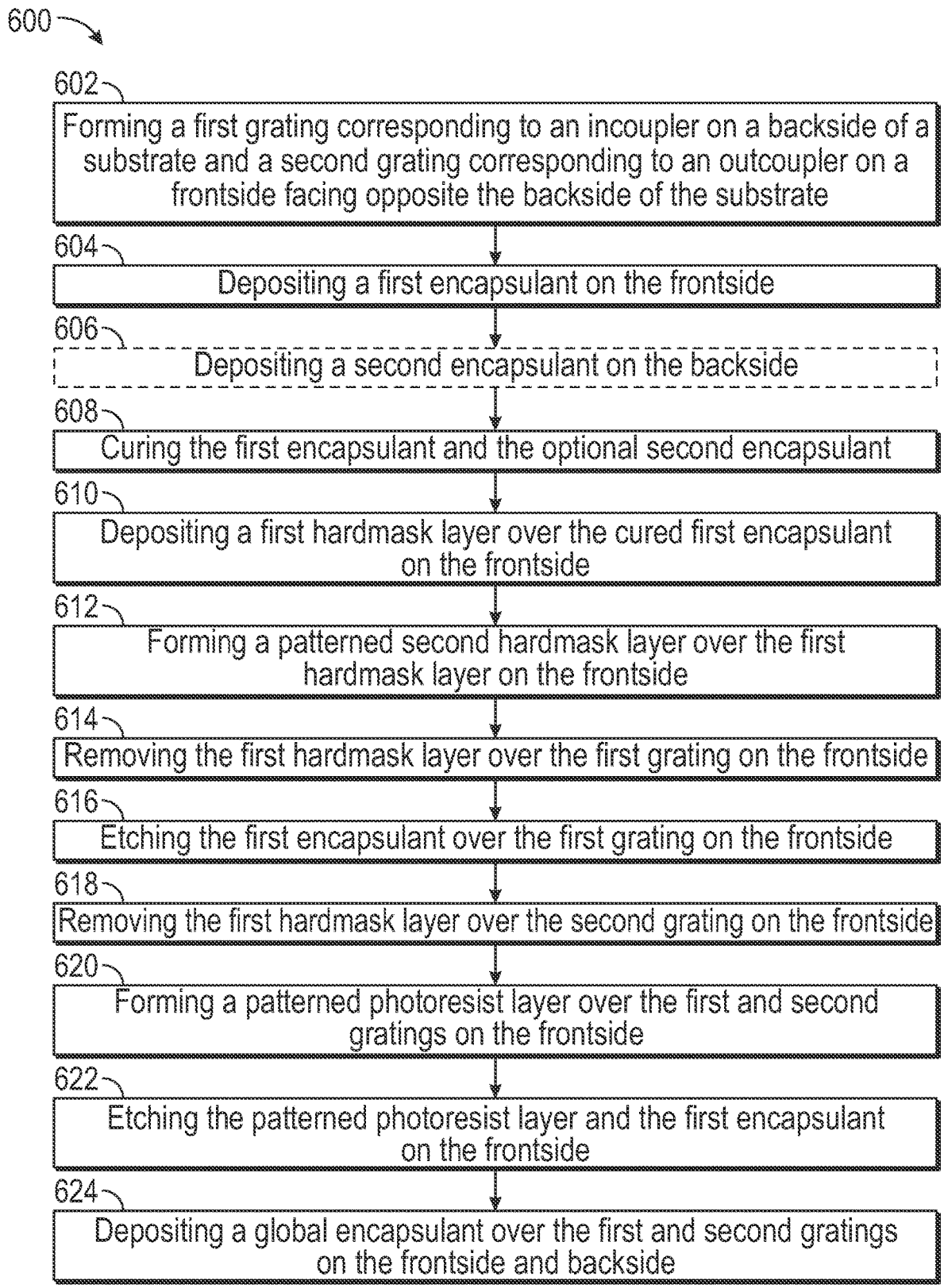
FIG. 6 is a flow chart illustrating operations of a method for encapsulating waveguide gratings according to yet another embodiment.

FIG. 6 is a flow chart illustrating operations of a method 600 for encapsulating waveguide gratings according to an embodiment. FIGS. 7A-7J are schematic, cross-sectional views of a waveguide combiner 100D during fabrication according to an embodiment.

Figure 7A:
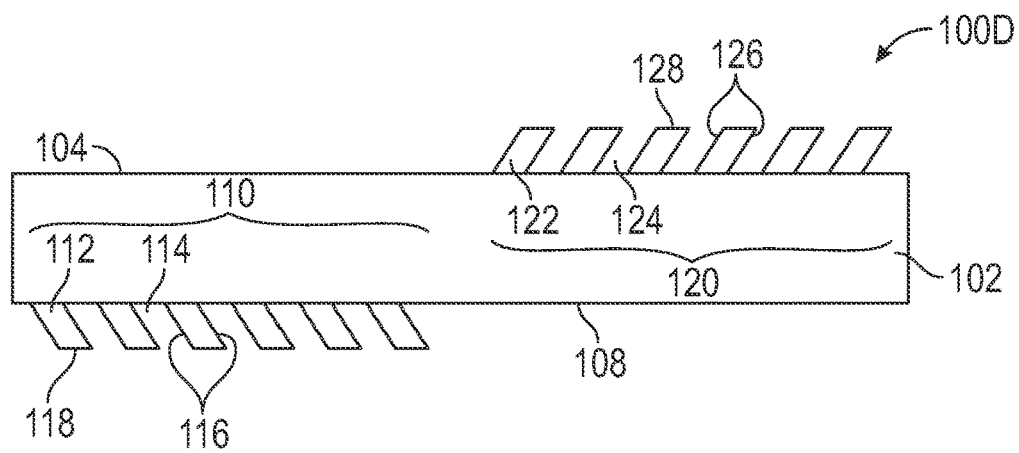
FIGS. 7A-7J are schematic, cross-sectional views of a waveguide combiner during fabrication according to yet another embodiment.

Referring to FIGS. 6 and 7A, at step 602, the method 600 includes forming the first grating 110 corresponding to an incoupler on the backside 108 of the substrate 102 and the second grating 120 corresponding to an outcoupler on the frontside 104 facing opposite the backside 108 of the substrate 102. Step 602 is analogous to step 202 of the method 200 except that the first grating 110 is formed on the backside 108 of the substrate 102.

Figure 7B:
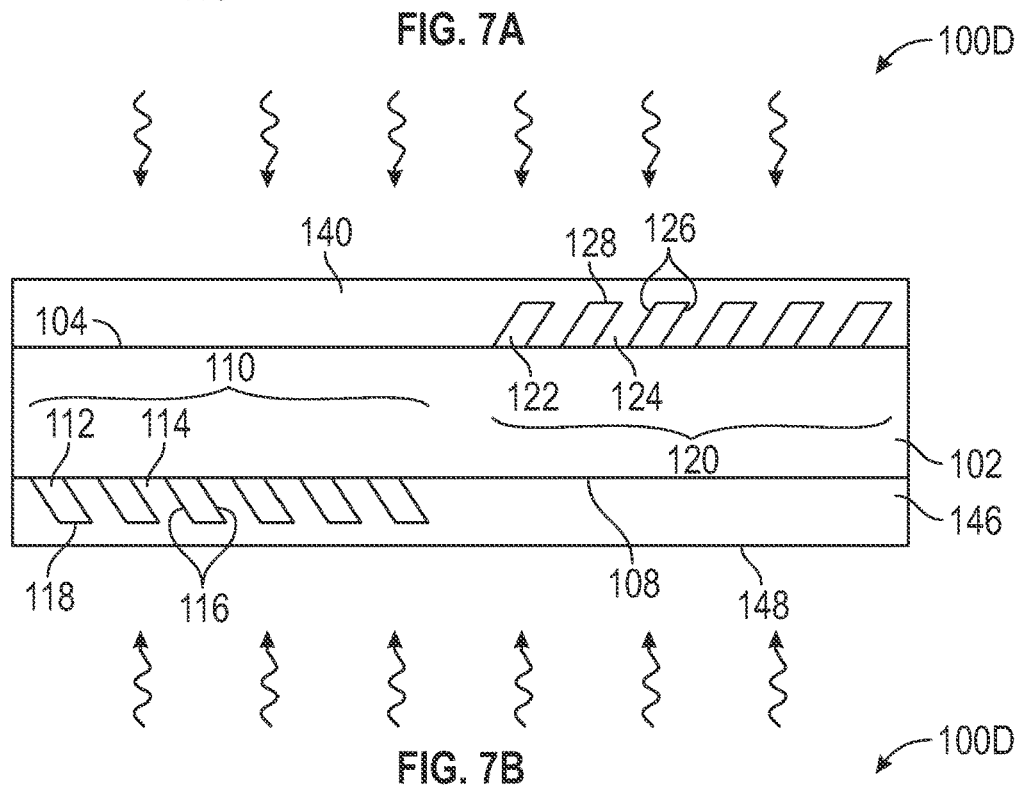

Referring to FIGS. 6 and 7B, at step 604, the method 600 includes depositing the first encapsulant 140 on the frontside 104. Step 604 is analogous to step 204 of the method 200 except that the first encapsulant 140 is deposited over the surface 104 of the substrate 102, in the gaps 124, and along the sidewalls 126 and top surfaces 128 of the structures 122.

Referring to FIGS. 6 and 7B, at step 606, the method 600 optionally includes depositing the second encapsulant 146 on the backside 108. The second encapsulant 146 is deposited over the backside surface 108 of the substrate 102, in the gaps 114 and over the structures 112. The second encapsulant 146 has a surface 148 facing away from the backside 108 of the substrate 102. The second encapsulant 146 may be formed by any suitable process. For example, the second encapsulant 146 may be formed by one or more of PVD, CVD, PECVD, FCVD, ALD, and spin-on processes.

Referring to FIGS. 6 and 7B, at step 608, the method 600 includes curing the first encapsulant 140 and the optional second encapsulant 146. Step 608 is analogous to step 206 of the method 200 except that the curing process may be applied to the frontside 104 and backside 108 of the substrate 102.

Figure 7C:
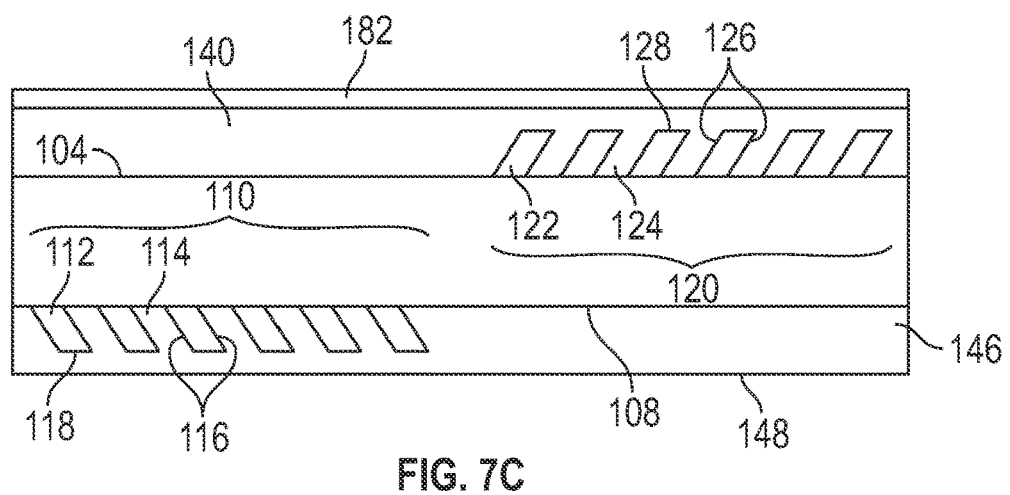
Figure 7D:
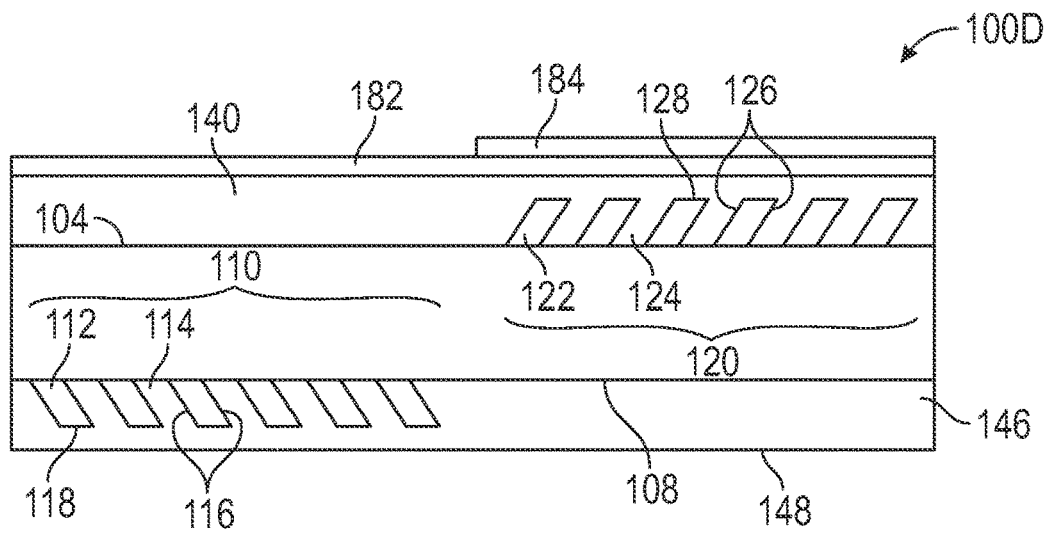
Figure 7E:
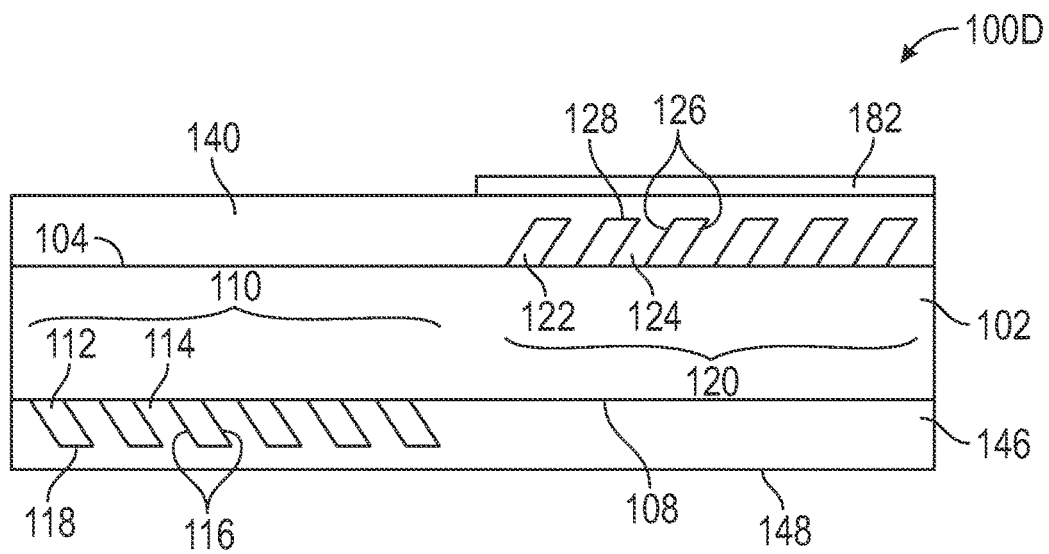
Figure 7F:
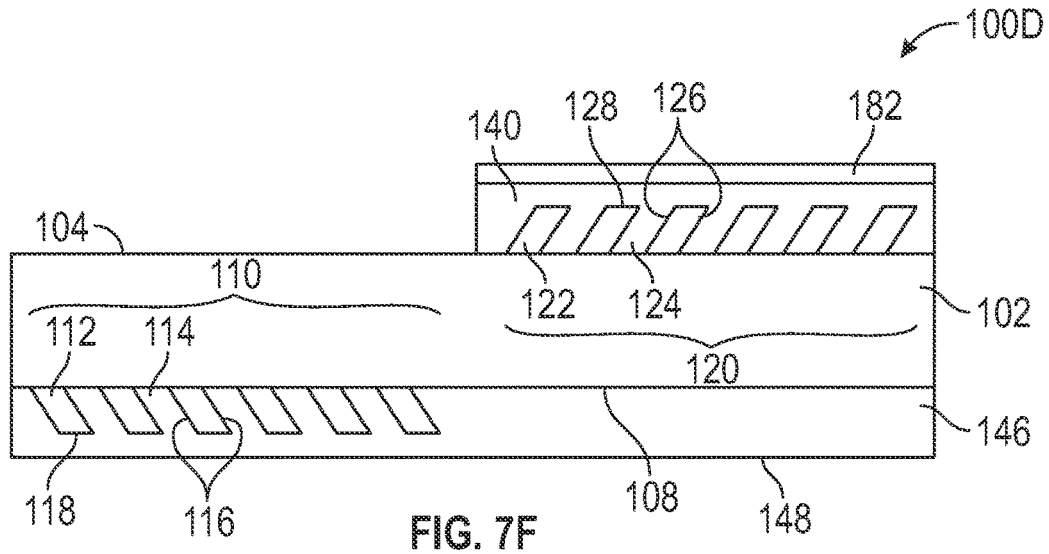
Figure 7G:
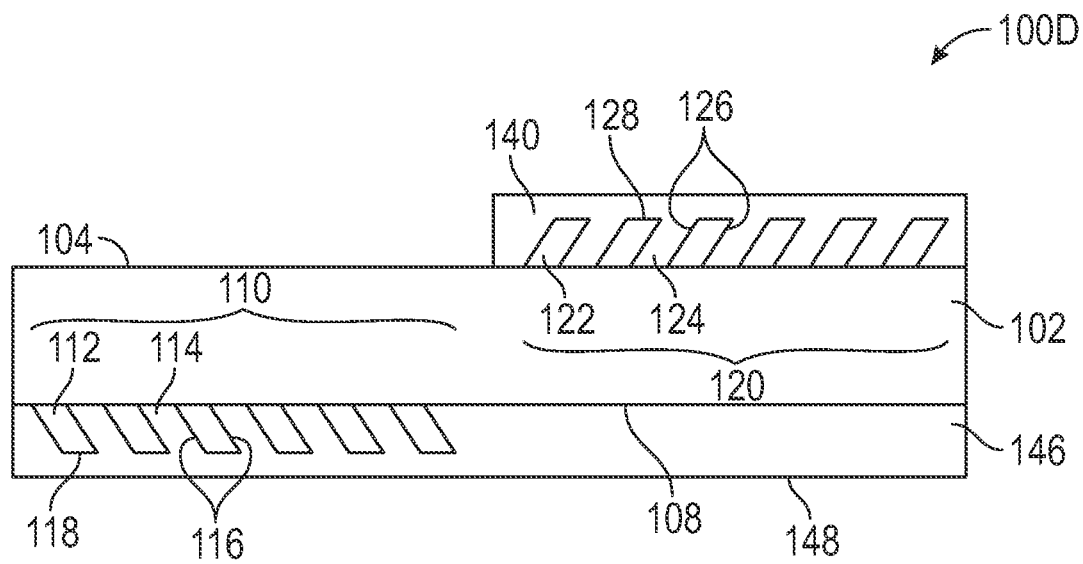
Figure 7H:
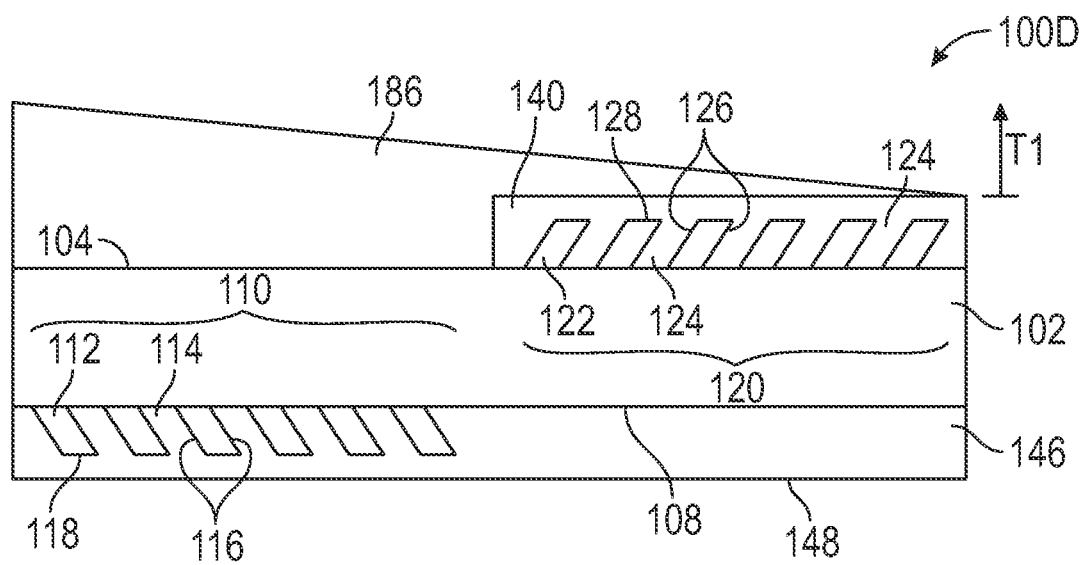
Figure 7I:
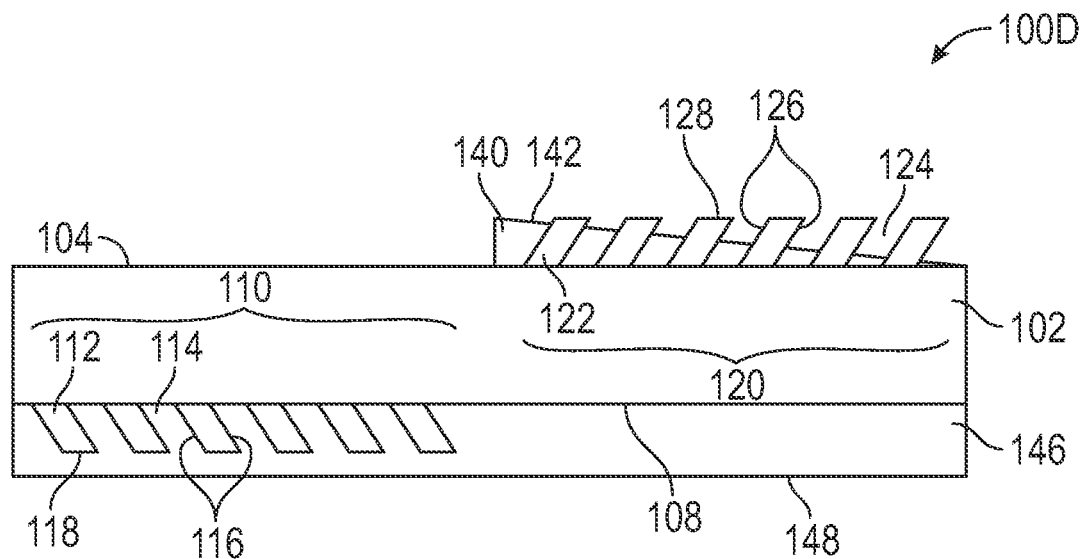

Referring to FIGS. 6 and 7C, at step 610, the method 600 includes depositing a first hardmask layer 182 over the cured first encapsulant 140 on the frontside 104. Referring to FIGS. 6 and 7D, at step 612, the method 600 includes forming a patterned second hardmask layer 184 over the first hardmask layer 182 on the frontside 104. Referring to FIGS. 6 and 7E, at step 614, the method 600 includes removing the first hardmask layer 182 over the first grating 110 on the frontside 104. Referring to FIGS. 6 and 7F, at step 616, the method 600 includes etching the first encapsulant 140 over the first grating 110 on the frontside 104. Referring to FIGS. 6 and 7G, at step 618, the method 600 includes removing the first hardmask layer 182 over the second grating 120 on the frontside 104. Referring to FIGS. 6 and 7H, at step 620, the method 600 includes forming a patterned photoresist layer 186 over the first and second gratings 110, 120 on the frontside 104. Referring to FIGS. 6 and 7I, at step 622, the method 600 includes etching the patterned photoresist layer 186 and the first encapsulant 140 on the frontside 104. Steps 610 through 622 are analogous to steps 208 through 220 of the method 200 except that the waveguide combiner 100D has the first grating 110 on the backside 108.

Figure 7J:
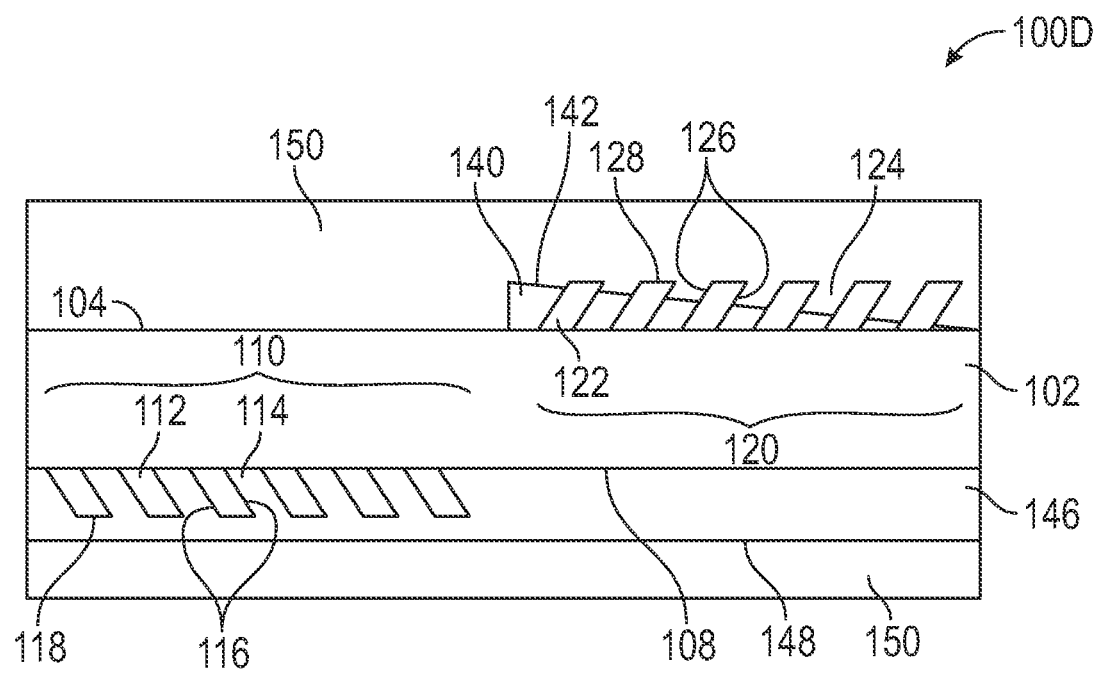

Referring to FIGS. 6 and 7J, at step 624, the method 600 includes depositing the global encapsulant 150 over the first and second gratings 110, 120 on the frontside 104 and backside 108. Step 624 is analogous to step 222 of the method 200 except that the global encapsulant 150 is disposed over the frontside 104 and backside 108. The global encapsulant 150 is disposed on the surface 148 of the second encapsulant 146 over the first and second gratings 110, 120.

While the foregoing is directed to examples of the present disclosure, other and further examples of the disclosure may be devised without departing from the basic scope thereof, and the scope thereof is determined by the claims that follow.

What is claimed is:

1. A device comprising:
 a first grating formed on a surface of a substrate, the first grating having a plurality of first structures slanted in a first direction at a slant angle relative to normal to the surface of the substrate, the first grating corresponding to an outcoupler; and
 a first encapsulant disposed in one or more gaps formed between adjacent first structures, wherein a fill ratio of the first encapsulant decreases from 1 to 0 along the first grating in the first direction.

2. The device of claim 1, wherein the first encapsulant has a refractive index contrast of about 0.2 or less relative to the first grating.

3. The device of claim 1, wherein the first encapsulant has a refractive index of from about 1.8 to about 2.2.

4. The device of claim 1, wherein the first encapsulant includes one or more of polyimides, polyimide blends, or metal-organic polyimide blends.

5. The device of claim 1, wherein the fill ratio decreases linearly.

6. The device of claim 1, wherein the fill ratio decreases stepwise.

7. The device of claim 1, wherein the fill ratio decreases non-linearly.

8. The device of claim 1, further comprising a second grating formed over the substrate, the second grating having a plurality of second structures extending away from the substrate, the second grating corresponding to an incoupler.

9. A device comprising:
 a first grating formed on a first surface of a substrate, the first grating having a plurality of first structures slanted in a first direction at a first slant angle relative to normal to the first surface of the substrate, the first grating corresponding to an outcoupler;
 a first encapsulant disposed in one or more first gaps formed between adjacent first structures, wherein a fill ratio of the first encapsulant decreases from 1 to 0 along the first grating in the first direction; and
 a second grating formed on a second surface of the substrate, the second grating having a plurality of second structures slanted in a second direction at a second slant angle relative to normal to the second surface of the substrate, the second grating corresponding to an incoupler.

10. The device of claim 9, wherein the first encapsulant is disposed in one or more second gaps formed between adjacent second structures.

11. The device of claim 9, wherein the first surface and the second surface are each a frontside of the substrate.

12. The device of claim 9, wherein the first surface is a frontside of the substrate, and the second surface is a backside of the substrate facing opposite the frontside.

13. The device of claim 12, further comprising a second encapsulant disposed over the backside of the substrate, wherein the second encapsulant is disposed in one or more second gaps formed between adjacent second structures.

14. A method, comprising:
 forming a first grating on a first surface of a substrate, the first grating having a plurality of first structures slanted in a first direction at a first slant angle relative to normal to the first surface of the substrate, the first grating corresponding to an outcoupler;
 forming a second grating on a second surface of the substrate, the second grating having a plurality of second structures slanted in a second direction at a second slant angle relative to normal to the second surface of the substrate, the second grating corresponding to an incoupler;
 depositing a first encapsulant over the first and second gratings;
 curing the first encapsulant;
 forming a patterned photoresist layer over the first and second gratings;
 etching the first encapsulant via the patterned photoresist layer, wherein a fill ratio of the first encapsulant decreases from 1 to 0 along the first grating in the first direction; and
 depositing a global encapsulant over the first and second gratings.

15. The method of claim 14, further comprising:
 depositing a first hardmask layer over the cured first encapsulant; and
 forming a patterned second hardmask layer over the first hardmask layer.

16. The method of claim 15, further comprising:
 removing the first hardmask layer over the first grating; and
 etching the first encapsulant over the first grating using one of the patterned second hardmask layer or the first hardmask layer as an etch mask.

17. The method of claim 14, wherein forming the patterned photoresist layer comprises performing a gray-scale lithography process.

18. The method of claim 14, wherein etching the first encapsulant via the patterned photoresist layer comprises transferring a profile of the patterned photoresist layer to the first encapsulant.

19. The method of claim 14, wherein the first grating is formed on a frontside of the substrate, wherein the first encapsulant is deposited on the frontside, and wherein the second grating is formed on a backside of the substrate facing opposite the frontside, further comprising depositing a second encapsulant on the backside.

* * * * *